United States Patent
Dharmapurikar et al.

(10) Patent No.: US 7,602,785 B2
(45) Date of Patent: Oct. 13, 2009

(54) METHOD AND SYSTEM FOR PERFORMING LONGEST PREFIX MATCHING FOR NETWORK ADDRESS LOOKUP USING BLOOM FILTERS

(75) Inventors: Sarang Dharmapurikar, St. Louis, MO (US); Praveen Krishnamurthy, St. Louis, MO (US); David Edward Taylor, University City, MO (US)

(73) Assignee: Washington University, St. Louis, MO (US)

( * ) Notice: Subject to any disclaimer, the term of this patent is extended or adjusted under 35 U.S.C. 154(b) by 1048 days.

(21) Appl. No.: 11/055,767

(22) Filed: Feb. 9, 2005

(65) Prior Publication Data

US 2005/0195832 A1    Sep. 8, 2005

Related U.S. Application Data

(60) Provisional application No. 60/543,222, filed on Feb. 9, 2004.

(51) Int. Cl.
H04L 12/28 (2006.01)
H04L 12/56 (2006.01)
G06F 7/00 (2006.01)
G06F 15/16 (2006.01)

(52) U.S. Cl. .................. 370/392; 370/395.32; 707/6; 709/245

(58) Field of Classification Search ................. None
See application file for complete search history.

(56) References Cited

U.S. PATENT DOCUMENTS 3,601,808 A    8/1971    Vlack
3,611,314 A    10/1971    Pritchard, Jr. et al.

(Continued)

FOREIGN PATENT DOCUMENTS

EP    0880088    11/1998

(Continued)

OTHER PUBLICATIONS

Dharmapurikar et al, Longest Prefix Matching using Bloom Filters, Aug. 25-29, 2003, SIGCOMM'03, whole document.*

(Continued)

*Primary Examiner*—Pankaj Kumar
*Assistant Examiner*—Hicham B Foud
(74) *Attorney, Agent, or Firm*—Edward J. Radlo; Glenn Patent Group

(57) ABSTRACT

The present invention relates to a method and system of performing parallel membership queries to Bloom filters for Longest Prefix Matching, where address prefix memberships are determined in sets of prefixes sorted by prefix length. Hash tables corresponding to each prefix length are probed from the longest to the shortest match in the vector, terminating when a match is found or all of the lengths are searched. The performance, as determined by the number of dependent memory accesses per lookup, is held constant for longer address lengths or additional unique address prefix lengths in the forwarding table given that memory resources scale linearly with the number of prefixes in the forwarding table. For less than 2 Mb of embedded RAM and a commodity SRAM, the present technique achieves average performance of one hash probe per lookup and a worst case of two hash probes and one array access per lookup.

34 Claims, 5 Drawing Sheets

U.S. PATENT DOCUMENTS

| | | |
|---|---|---|
| 3,729,712 A | 4/1973 | Glassman |
| 3,824,375 A | 7/1974 | Gross et al. |
| 3,848,235 A | 11/1974 | Lewis et al. |
| 3,906,455 A | 9/1975 | Houston et al. |
| 4,081,607 A | 3/1978 | Vitols |
| 4,298,898 A | 11/1981 | Cardot |
| 4,314,356 A | 2/1982 | Scarbrough |
| 4,385,393 A | 5/1983 | Chaure et al. |
| 4,464,718 A | 8/1984 | Dixon et al. |
| 4,550,436 A | 10/1985 | Freeman et al. |
| 4,823,306 A | 4/1989 | Barbic et al. |
| 4,941,178 A | 7/1990 | Chuang |
| 5,023,910 A | 6/1991 | Thomson |
| 5,050,075 A | 9/1991 | Herman et al. |
| 5,077,665 A | 12/1991 | Silverman et al. |
| 5,101,424 A | 3/1992 | Clayton et al. |
| 5,126,936 A | 6/1992 | Champion et al. |
| 5,140,692 A | 8/1992 | Morita |
| 5,163,131 A | 11/1992 | Row et al. |
| 5,179,626 A | 1/1993 | Thomson |
| 5,226,165 A | 7/1993 | Martin |
| 5,243,655 A | 9/1993 | Wang |
| 5,249,292 A | 9/1993 | Chiappa |
| 5,255,136 A | 10/1993 | Machado et al. |
| 5,265,065 A | 11/1993 | Turtle |
| 5,270,922 A | 12/1993 | Higgins |
| 5,274,679 A | 12/1993 | Abe et al. |
| 5,319,776 A | 6/1994 | Hile et al. |
| 5,327,521 A | 7/1994 | Savic et al. |
| 5,339,411 A | 8/1994 | Haton, Jr. et al. |
| 5,347,634 A | 9/1994 | Herrell et al. |
| 5,371,794 A | 12/1994 | Diffie et al. |
| 5,388,259 A | 2/1995 | Fleischman et al. |
| 5,396,253 A | 3/1995 | Chia |
| 5,418,951 A | 5/1995 | Damashek |
| 5,421,028 A | 5/1995 | Swanson |
| 5,432,822 A | 7/1995 | Kaewell, Jr. |
| 5,440,723 A | 8/1995 | Arnold et al. |
| 5,461,712 A | 10/1995 | Chelstowski et al. |
| 5,465,353 A | 11/1995 | Hull et al. |
| 5,481,735 A | 1/1996 | Mortensen et al. |
| 5,487,151 A | 1/1996 | Kikuchi et al. |
| 5,488,725 A | 1/1996 | Turtle et al. |
| 5,497,488 A | 3/1996 | Akizawa et al. |
| 5,544,352 A | 8/1996 | Egger |
| 5,546,578 A | 8/1996 | Takada |
| 5,629,980 A | 5/1997 | Stefik et al. |
| 5,651,125 A | 7/1997 | Witt et al. |
| 5,701,464 A * | 12/1997 | Aucsmith ............... 707/10 |
| 5,710,757 A | 1/1998 | May |
| 5,721,898 A | 2/1998 | Beardsley et al. |
| 5,740,244 A | 4/1998 | Indeck et al. |
| 5,740,466 A | 4/1998 | Geldman et al. |
| 5,761,431 A | 6/1998 | Gross et al. |
| 5,774,835 A | 6/1998 | Ozawa |
| 5,774,839 A | 6/1998 | Shlomot |
| 5,781,772 A | 7/1998 | Wilkinson, III |
| 5,781,921 A | 7/1998 | Nichols |
| 5,805,832 A | 9/1998 | Brown et al. |
| 5,813,000 A | 9/1998 | Furlani |
| 5,819,273 A | 10/1998 | Vora et al. |
| 5,819,290 A | 10/1998 | Fujita |
| 5,826,075 A | 10/1998 | Bealkowski et al. |
| 5,864,738 A | 1/1999 | Kessler et al. |
| 5,870,730 A | 2/1999 | Furya et al. |
| 5,884,286 A | 3/1999 | Daughtery, III |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Handal |
| 5,974,414 A | 10/1999 | Stanczak et al. |
| 5,978,801 A | 11/1999 | Yuasa |
| 5,987,432 A | 11/1999 | Zusman et al. |
| 5,991,881 A | 11/1999 | Conklin et al. |
| 5,995,963 A | 11/1999 | Nanba et al. |
| 6,023,760 A | 2/2000 | Karttunen |
| 6,028,939 A | 2/2000 | Yin |
| 6,044,407 A | 3/2000 | Jones et al. |
| 6,058,391 A | 5/2000 | Gardner |
| 6,061,662 A | 5/2000 | Makivic |
| 6,067,569 A | 5/2000 | Khaki et al. |
| 6,070,172 A | 5/2000 | Lowe |
| 6,073,160 A | 6/2000 | Grantham et al. |
| 6,105,067 A | 8/2000 | Batra |
| 6,108,782 A | 8/2000 | Fletcher et al. |
| 6,112,181 A | 8/2000 | Shear et al. |
| 6,115,751 A | 9/2000 | Tam et al. |
| 6,134,551 A | 10/2000 | Aucsmith |
| 6,138,176 A | 10/2000 | McDonald et al. |
| RE36,946 E | 11/2000 | Diffie et al. |
| 6,147,976 A | 11/2000 | Shand et al. |
| 6,169,969 B1 | 1/2001 | Cohen |
| 6,173,276 B1 | 1/2001 | Kant et al. |
| 6,175,874 B1 | 1/2001 | Imai et al. |
| 6,205,148 B1 | 3/2001 | Takahashi et al. |
| 6,216,173 B1 | 4/2001 | Jones et al. |
| 6,219,786 B1 | 4/2001 | Cunningham et al. |
| 6,226,676 B1 | 5/2001 | Crump et al. |
| 6,233,618 B1 | 5/2001 | Shannon |
| 6,233,684 B1 | 5/2001 | Stefik et al. |
| 6,237,028 B1 | 5/2001 | Jackson |
| 6,259,909 B1 | 7/2001 | Ratayczak et al. |
| 6,263,321 B1 | 7/2001 | Daughtery |
| 6,279,113 B1 | 8/2001 | Vaidya |
| 6,317,795 B1 | 11/2001 | Malkin et al. |
| 6,336,150 B1 | 1/2002 | Ellis et al. |
| 6,343,324 B1 | 1/2002 | Hubis et al. |
| 6,363,384 B1 | 3/2002 | Cookmeyer, II et al. |
| 6,370,645 B1 | 4/2002 | Lee |
| 6,377,942 B1 | 4/2002 | Hinsley |
| 6,381,242 B1 | 4/2002 | Maher, III et al. |
| 6,389,532 B1 | 5/2002 | Gupta et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,418,419 B1 | 7/2002 | Nieboer et al. |
| 6,430,272 B1 | 8/2002 | Maruyama et al. |
| 6,456,982 B1 | 9/2002 | Pilipovic |
| 6,463,474 B1 | 10/2002 | Fuh et al. |
| 6,499,107 B1 | 12/2002 | Gleichauf et al. |
| 6,546,375 B1 | 4/2003 | Pang et al. |
| 6,564,263 B1 | 5/2003 | Bergman et al. |
| 6,578,147 B1 | 6/2003 | Shanklin et al. |
| 6,628,652 B1 | 9/2003 | Chrin et al. |
| 6,643,717 B1 | 11/2003 | Rustad et al. |
| 6,704,816 B1 | 3/2004 | Burke |
| 6,711,558 B1 | 3/2004 | Indeck et al. |
| 6,728,929 B1 | 4/2004 | Luong |
| 6,765,918 B1 | 7/2004 | Dixon et al. |
| 6,772,136 B2 | 8/2004 | Kant et al. |
| 6,772,345 B1 | 8/2004 | Shetty |
| 6,775,290 B1 | 8/2004 | Merchant et al. |
| 6,778,968 B1 | 8/2004 | Gulati |
| 6,785,677 B1 | 8/2004 | Fritchman |
| 6,804,667 B1 | 10/2004 | Martin |
| 6,807,156 B1 | 10/2004 | Veres et al. |
| 6,850,906 B1 | 2/2005 | Chadha et al. |
| 6,856,981 B2 | 2/2005 | Wyschogrod et al. |
| 6,870,837 B2 | 3/2005 | Ho et al. |
| 6,877,044 B2 | 4/2005 | Lo et al. |
| 6,886,103 B1 | 4/2005 | Brustoloni et al. |
| 6,901,461 B2 | 5/2005 | Bennett |
| 6,928,549 B2 | 8/2005 | Brock et al. |
| 6,931,408 B2 | 8/2005 | Adams et al. |

| | | |
|---|---|---|
| 6,944,168 B2 | 9/2005 | Paatela et al. |
| 7,457,834 B2 * | 11/2005 | Jung et al. .................. 707/204 |
| 6,978,223 B2 | 12/2005 | Milliken |
| 6,981,054 B1 | 12/2005 | Krishna |
| 7,019,674 B2 * | 3/2006 | Cadambi et al. ............ 341/106 |
| 7,024,384 B2 | 4/2006 | Daughter, III |
| 7,046,848 B1 | 5/2006 | Olcott |
| 7,065,475 B1 | 6/2006 | Brundobler |
| 7,093,023 B2 | 8/2006 | Lockwood et al. |
| 7,099,838 B1 | 8/2006 | Gastineau et al. |
| 7,103,569 B1 | 9/2006 | Groveman et al. |
| 7,103,799 B2 | 9/2006 | Dixon |
| 7,117,370 B2 | 10/2006 | Khan et al. |
| 7,127,510 B2 | 10/2006 | Yoda et al. |
| 7,139,743 B2 | 11/2006 | Indeck et al. |
| 7,149,715 B2 | 12/2006 | Browne et al. |
| 7,167,980 B2 | 1/2007 | Chiu |
| 7,181,437 B2 | 2/2007 | Indeck et al. |
| 7,181,608 B2 | 2/2007 | Fallon et al. |
| 7,181,765 B2 | 2/2007 | Patel et al. |
| 7,222,114 B1 | 5/2007 | Chan et al. |
| 7,224,185 B2 | 5/2007 | Campbell et al. |
| 7,225,188 B1 | 5/2007 | Gai et al. |
| 7,251,629 B1 | 7/2007 | Marynowski et al. |
| 7,286,564 B2 | 10/2007 | Roberts |
| 7,305,383 B1 | 12/2007 | Kubesh et al. |
| 7,305,391 B2 | 12/2007 | Wyschogrod et al. |
| 7,308,715 B2 | 12/2007 | Gupta et al. |
| 7,386,564 B2 | 6/2008 | Abdo et al. |
| 7,408,932 B2 * | 8/2008 | Kounavis et al. ............ 370/392 |
| 7,411,957 B2 | 8/2008 | Stacy et al. |
| 7,444,515 B2 * | 10/2008 | Dharmapurikar et al. ... 713/176 |
| 7,461,064 B2 * | 12/2008 | Fontoura et al. ................ 707/7 |
| 7,467,155 B2 | 12/2008 | McCool et al. |
| 7,480,253 B1 * | 1/2009 | Allan .......................... 370/252 |
| 2001/0014093 A1 | 8/2001 | Yoda et al. |
| 2001/0052038 A1 | 12/2001 | Fallon et al. |
| 2001/0056547 A1 | 12/2001 | Dixon |
| 2002/0031125 A1 | 3/2002 | Sato |
| 2002/0069370 A1 | 6/2002 | Mack |
| 2002/0082967 A1 | 6/2002 | Kaminsky et al. |
| 2002/0095512 A1 | 7/2002 | Rana et al. |
| 2002/0105911 A1 | 8/2002 | Pruthi et al. |
| 2002/0129140 A1 | 9/2002 | Peled et al. |
| 2002/0138376 A1 | 9/2002 | Hinkle |
| 2002/0162025 A1 | 10/2002 | Sutton et al. |
| 2002/0166063 A1 | 11/2002 | Lachman, III et al. |
| 2003/0002502 A1 | 1/2003 | Gibson et al. |
| 2003/0009693 A1 | 1/2003 | Brock et al. |
| 2003/0014662 A1 | 1/2003 | Gupta et al. |
| 2003/0018630 A1 | 1/2003 | Indeck et al. |
| 2003/0023876 A1 | 1/2003 | Bardsley et al. |
| 2003/0033240 A1 | 2/2003 | Balson et al. |
| 2003/0037037 A1 | 2/2003 | Adams et al. |
| 2003/0043805 A1 | 3/2003 | Graham et al. |
| 2003/0051043 A1 | 3/2003 | Wyschogrod et al. |
| 2003/0055658 A1 | 3/2003 | RuDusky |
| 2003/0055770 A1 | 3/2003 | RuDusky |
| 2003/0055771 A1 | 3/2003 | RuDusky |
| 2003/0055777 A1 | 3/2003 | Ginsberg |
| 2003/0065943 A1 | 4/2003 | Geis et al. |
| 2003/0074582 A1 | 4/2003 | Patel et al. |
| 2003/0078865 A1 | 4/2003 | Lee |
| 2003/0093347 A1 | 5/2003 | Gray |
| 2003/0110229 A1 | 6/2003 | Kulig et al. |
| 2003/0126065 A1 | 7/2003 | Eng et al. |
| 2003/0177253 A1 | 9/2003 | Schuehler et al. |
| 2003/0208430 A1 | 11/2003 | Gershon |
| 2003/0221013 A1 | 11/2003 | Lockwood et al. |
| 2004/0028047 A1 | 2/2004 | Hou et al. |
| 2004/0034587 A1 | 2/2004 | Amberson et al. |
| 2004/0049596 A1 | 3/2004 | Schuehler et al. |
| 2004/0054924 A1 * | 3/2004 | Chuah et al. ................. 713/201 |
| 2004/0100977 A1 | 5/2004 | Suzuki et al. |
| 2004/0105458 A1 | 6/2004 | Ishizuka |
| 2004/0107361 A1 | 6/2004 | Redan et al. |
| 2004/0133634 A1 | 7/2004 | Luke et al. |
| 2004/0162826 A1 | 8/2004 | Wyschogrod et al. |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0196905 A1 | 10/2004 | Yamane et al. |
| 2004/0199448 A1 | 10/2004 | Chalermkraivuth et al. |
| 2004/0205149 A1 | 10/2004 | Dillon et al. |
| 2005/0005145 A1 | 1/2005 | Teixeira |
| 2005/0033672 A1 | 2/2005 | Lasry et al. |
| 2005/0086520 A1 | 4/2005 | Dharmapurikar et al. |
| 2005/0091142 A1 | 4/2005 | Renton et al. |
| 2005/0097027 A1 | 5/2005 | Kavanaugh |
| 2005/0131790 A1 | 6/2005 | Benzschawel et al. |
| 2005/0175010 A1 * | 8/2005 | Wilson et al. ............... 370/392 |
| 2005/0187844 A1 | 8/2005 | Chalermkraivuth et al. |
| 2005/0187845 A1 | 8/2005 | Elkund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0187974 A1 | 8/2005 | Gong |
| 2005/0195832 A1 | 9/2005 | Dharmapurikar et al. |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0216384 A1 | 9/2005 | Partlow et al. |
| 2005/0232180 A1 | 10/2005 | Toporek et al. |
| 2005/0267836 A1 | 12/2005 | Crosthwaite et al. |
| 2005/0283423 A1 | 12/2005 | Moser et al. |
| 2006/0020536 A1 | 1/2006 | Renton et al. |
| 2006/0023384 A1 | 2/2006 | Mukherjee et al. |
| 2006/0031154 A1 | 2/2006 | Noviello et al. |
| 2006/0031156 A1 | 2/2006 | Noviello et al. |
| 2006/0031263 A1 | 2/2006 | Arrouye et al. |
| 2006/0036693 A1 | 2/2006 | Hulten et al. |
| 2006/0047636 A1 | 3/2006 | Mohania et al. |
| 2006/0053295 A1 | 3/2006 | Madhusudan et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0059083 A1 | 3/2006 | Friesen et al. |
| 2006/0059099 A1 | 3/2006 | Ronning et al. |
| 2006/0075119 A1 | 4/2006 | Hussain et al. |
| 2006/0092943 A1 | 5/2006 | Sundaram et al. |
| 2006/0136570 A1 | 6/2006 | Pandya |
| 2006/0164978 A1 | 7/2006 | Werner et al. |
| 2006/0259417 A1 | 11/2006 | Marynowski et al. |
| 2006/0269148 A1 | 11/2006 | Farber et al. |
| 2006/0294059 A1 | 12/2006 | Chamberlain et al. |
| 2007/0067108 A1 | 3/2007 | Buhler et al. |
| 2007/0078837 A1 | 4/2007 | Indeck et al. |
| 2007/0118500 A1 | 5/2007 | Indeck et al. |
| 2007/0130140 A1 | 6/2007 | Cytron et al. |
| 2007/0174841 A1 | 7/2007 | Chamberlain et al. |
| 2007/0277036 A1 | 11/2007 | Chamberlain et al. |
| 2008/0037420 A1 | 2/2008 | Tang |
| 2008/0109413 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2009/0019538 A1 | 1/2009 | Pandya |

FOREIGN PATENT DOCUMENTS

EP 0887723 12/1998

| | | | |
|---|---|---|---|
| EP | 0911738 A2 | 4/1999 |
| EP | 0 573 991 B1 | 1/2002 |
| EP | 0851358 | 3/2003 |
| JP | 9-269930 | 10/1997 |
| JP | 10-313341 | 11/1998 |
| JP | 2000-357176 | 12/2000 |
| JP | 2001-014239 | 1/2001 |
| JP | 2001-217834 | 10/2001 |
| JP | 2001-518724 | 10/2001 |
| WO | WO 90/10910 | 9/1990 |
| WO | WO 97/37735 | 10/1997 |
| WO | WO 99/05814 | 2/1999 |
| WO | WO 99/55052 | 10/1999 |
| WO | WO 01/22425 A1 | 3/2001 |
| WO | WO 01/39577 | 6/2001 |
| WO | WO 01/61913 A2 | 8/2001 |
| WO | WO 01/80082 A2 | 10/2001 |
| WO | WO 01/80558 A2 | 10/2001 |
| WO | WO 02/061525 A3 | 8/2002 |
| WO | WO 02/082271 A1 | 10/2002 |
| WO | WO 03/036845 A2 | 5/2003 |
| WO | WO 03/100650 A1 | 12/2003 |
| WO | WO 03/100662 | 12/2003 |
| WO | WO 2004/017604 A2 | 2/2004 |
| WO | WO 2004/042560 A2 | 5/2004 |
| WO | WO 2004/042561 A2 | 5/2004 |
| WO | WO 2004/042562 A2 | 5/2004 |
| WO | WO 2004/042574 A2 | 5/2004 |
| WO | WO 2005/017708 A2 | 2/2005 |
| WO | WO 2005/026925 A2 | 3/2005 |
| WO | WO 2005/048134 | 5/2005 |
| WO | WO 2006/023948 | 3/2006 |
| WO | WO 2006/096324 | 9/2006 |
| WO | WO 2008/022036 | 2/2008 |

OTHER PUBLICATIONS

Agere Systems, " Lucent Delivers 'Payload Plus' Network Processors for Programmable, Multiprotocol, OC-48c Processing", Agere Systems Press Release, Oct. 30, 2000, Allentown, PA.
Agere Systems, "Payload Plus™ Agere System Interface", Agere Systems Product Brief, Jun. 2001, downloaded from Internet, Jan. 2002, Allentown, PA.
Anerousis, Nikos et al., "Using the AT&T Labs Packetscope for Internet Measurement, Design, and Performance Analysis", AT&T Services and Infrastructure Performance Symposium, AT&T Labs-Research, Florham, Park, NJ, Oct. 1997, http:--www.net.t-labs.tu-berlin.de-papers-ACDFGKMRR-UPSIMDPA-97.pdf.
Artan, N. Sertec et al., "Multi-packet Signature Detection using Prefix Bloom Filters", IEEE Globecom 2005, pp. 1811-1816.
Baboescu, Florin et al., "Scalable Packet Classification", SIGCOMM'01, pp. 199-210, San Diego, CA, Aug. 27-21, 2001; http:--www.ecse.rpi.edu-homepages-shivkuma-teaching-sp2001-readings-baboescu-pkt-classification.pdf.
Baeza-Yates and Navarro, "New and Faster Filters for Multiple Approximate String Matching", Random Structures and Algorithms (RSA), vol. 20, No. 1, Jan. 2002, pp. 23-49.
Berk, Elliot, "JLex: A lexical analyzer generator for Java™", Sep. 6, 2000, downloaded from http:--www.cs.princeton.edu--appel-modern-java-Jlex- in Jan. 2002.
Bloom, Burton H., "Space-Time Trade-offs in Hash Coding With Allowable Errors", Communications of the ACM, 13(7): 422-426, Computer Usage Company, Newton Upper Falls, Massachusetts, USA, Jul. 1970.
Braun, Florian et al., "Layered Protocol Wrappers for Internet Packet Processing in Reconfigurable Hardware", Proceedings of Hot Interconnects 9 (Hotl-9) Stanford, CA, Aug. 22-24, 2001, pp. 93-98.
Choi, Sumi et al., "Design of a Flexible Open Platform for High Performance Active Networks", Allerton Conference, Champaign, IL, 1999.
Cloutier, Jocelyn et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.
Compton, Katherine et al., "Reconfigurable Computing: A Survey of Systems and Software", Technical Report, Northwestern University, IL, 16, Dept. of ECE, 1999.
Cuppu, Vinodh and Jacob, Bruce, "Organizational Design Trade-offs at the DRAM, Memory Bus, and Memory Controller Level: Initial Results," Technical Report UMB-SCA-TR-1999-2, Univ. of Maryland Systems & Computer Architecture Group, pp. 1-10, Nov. 1999, College Park, MD.
Dharmapurikar, Sarang et al., "Longest Prefix Matching Using Bloom Filters," SIGCOMM 2003, pp. 201-212, Karlsruhe, Germany, Aug. 25-29, 2003.
Dharmapurikar, Sarang et al., "Robust TCP Stream Reassembly In the Presence of Adversaries", Proceedings of the 14th Conference on USENIX Security Symposium—vol. 14, 16 pages, Baltimore, MD, 2005. http:--www.icir.org-vern-papers-TcpReassembly-TcpReassembly.pdf.
Franklin, R. et al., "Assisting Network Intrusion Detection with Reconfigurable Hardware", Symposium on Field-Programmable Custom Computing Machines (FCCM 2002), Apr. 2002, Napa, California.
Fu, Henry et al., "The FPX KCPSM Module: An Embedded, Reconfigurable Active Processing Module for the Field Programmable Port Extender (FPX)", Washington University, Department of Computer Science, Technical Report WUCS-01-74, Jul. 26, 2001, St. Louis, MO.
Gupta, Pankaj and McKeown, Nick, "Packet Classification on Multiple Fields", Computer Systems Laboratory, Stanford University, Stanford, CA, http:--yuba.stanford.edu--pankaj-paps-sig99.pdf, and Computer Communication Review, a publication of ACM SIGCOMM, vol. 29, No. 4, Oct. 1999.
Gurtov, Andrei, "Effect of Delays on TCP Performance", Cellular Systems Development, Sonera Corporation, online at http:--www.cs.helsinki.fi-u-gurtov-papers-pwc01.pdf.
Hauck, Scott and Agarwal, Anant, "Software Technologies for Reconfigurable Systems", Northwestern University, IL, Dept. of ECE, Technical Report, pp. 1-40, 1996.
Hollaar, Lee A., "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.
Jacobson, V. et al., "RFC 1072: TCP Extensions for Long-Delay Paths", Network Working Groupr, Oct. 1988, online at http:--www.faqs.org-ftp-rfc-pdf-rfc1072.txt.pdf.
Jacobson, Van et al., "tcpdump—dump traffic on a network" Jun. 30, 1997, online at www.cse.cuhk.eduhk--cslui-CEG4430-tcpdump.ps.gz.
Keutzer, Kurt & Shah, Niraj, "A Survey of Programmable Platforms—Network Proc", University of California-Berkeley, CA, Sep. 2001, Berkeley, CA.
Lockwood, John & Lim, David, "Hello, World: A Simple Application for the Field-programmable Port Extender (FPX)", Washington University, Department of Computer Science, Technical Report WUCS-TM-00-12, Jul. 11, 2000, St. Louis, MO.
Lockwood, John W., "Simulation of the Hello World Application for the Field-programmable Port Extender (FPX)" Washington University, Applied Research Lab, Spring 2001 Gigabits Kits Workshop, St. Louis, MO.
Lockwood, John, "Field-programmable Port Extender (FPX)" Jan. 2002 Workshop, Washington University, St. Louis, MO, Jan. 3-4, 2002. (slides and handouts from workshop).
Lockwood, John W. et al., "Field Programmable Port Extender (FPX) for Distributed Routing and Queuing" ACM International Symposium on Field Programmable Gate Arrays (FPGA '2000), Monterey, CA, Feb. 2000, pp. 137-144.
Lockwood, John et al., "Parallel FPGA Programming over Backplane Chassis", Washington University, Department of Computer Science, Technical Report WUCS-OO-II, Jun. 12, 2000, St. Louis, Mo.
Lockwood, John W. et al., "Reprogrammable Network Packet Processing on the Field Programmable Port Extender (FPX)", ACM International Symposium on Field Programmable Gate Arrays (FPGA 2001), Monterey, CA, Feb. 11-13, 2001, pp. 87-93.

Lockwood, John W., "An Open Platform for Development of Network Processing Modules in Reprogrammable Hardware", IEC Designcon 2001, Santa Clara, CA, Jan. 2001, Paper WB-19.

Lockwood, John W., "Evolvable Internet Hardware Platforms", NASA DoD Workshop on Evolvable Hardware (EHWOI), Long Beach, CA, Jul. 12-14, 2001, pp. 271-279.

Lockwood, John W., "Platform and Methodology for Teaching Design of Hardware Modules in Internet Routers and Firewalls", IEEE Computer Society International Conference on Microelectronic Systems Education (MSE 2OOI), Las Vegas, NV, Jun. 17-18, 2001, pp. 56-57.

Lucent, "Lucent Technologies delivers PayloadPlus network processors for programmable, multi-protocol, OC-48c processing", Lucent Technologies Press Release, downloaded from http:-lwww.lucent.com-press-1000-0010320.meb.html on Mar. 21, 2002.

Moscola, James M. et al., "FPGrep and FPSed: Regular Expression Search and Substitution for Packet Streaming in Field Programmable Hardware", Dept. of Computer Science, Applied Research Lab, Washintron University, St. Louis, MO, Jan. 8, 2002.

Moscola, James, "FPgrep and FPsed: Packet Payload Processors for Managing the Flow of Digital Content on Local Area Networks and the Internet", Masters Thesis, Sever Institute of Technology, Washington University, St. Louis, Missouri, Aug. 2003.

Moscola, James et al. "FPsed: A Streaming Content Search-and-Replace Module for an Internet Firewall", Proceedings of Hot Interconnects, 11th Symposium on High Performance Interconnects, pp. 122, 129, Aug. 20, 2003.

Navarro, Gonzalo, "A Guided Tour to Approximate String Matching", ACM Computing Surveys, vol. 33, No. 1, Mar. 2001, pp. 31-88, and online at http:--security.riit.tsinghua.edu.cn-seminar-2006_3_9-2001-A_Guided_Tour_to_Approximate_String_Matching.pdf.

Necker, Marc et al., "TCP-Stream Reassembly and State Tracking in Hardware" School of Electrical and Computer Engineering, Georgia Institute of Technology, Atlanta, GA, Proceedings of the 10th Annual IEEE Symposium of Field-Programmable Custom Computing Machines 2002, and online at:http:--csdl2.compter.org.comp.prodeedings-fccm-2002-1801-00-18010286.pdf.

Prakash, Amit et al., "OC-3072 Packet Classification Using BDDs and Pipelined SRAMs", Hot Interconnects, Stanford University, CA, Aug. 2001, and online at http:--users.ece.utexas.edu-~adnan-publications-prakash-hoti-01.pdf.

Pramanik, Sakti et al., "A Hardware Pattern Matching Algorithm on a Dataflow", The Computer Journal, Jul. 1, 1985, pp. 264-269, vol. 28, No. 3, Oxford University Press, London, Great Britain.

RFC793: Transmission Control Protocol, DARPA Internet Program, Protocol Specification, Sep. 1981, online at http:--www.faqs.org-ftp-pdf-rfc793.txt.pdf.

Schuehler, David V. et al., "Architecture for a Hardware Based, TCP-IP Content Scanning System", IEEE Micro, 24(1):62-69, Jan.-Feb. 2004, U.S.A.

Schuehler, David V. et al., "TCP-Splitter: A TCP-IP Flow Monitor in Reconfigurable Hardware", Hot Interconnects 10 (Hotl-10), Stanford, CA, Aug. 21-23, 2002, pp. 127-131.

Shah, Niraj, "Understanding Network Processors", Version 1 .O, University of California-Berkeley, Sep. 4, 2001, Berkeley, CA.

Sidhu, Reetinder et al., "Fast Regular Expression Matching using FPGAs", IEEE Symposium on Field Programmable Custom Computing Machines (FCCM 2001), Aprl. 2001.

Sidhu, Reetinder et al., "String Matching on Multicontext FPGAs using Self-Reconfiguration", FPGA '99: Proceedings of the 1999 ACMISIGDA 7th International Symposium on Field Programmable Gate Arrays, Feb. 1999, pp. 217-226, Monterey, CA.

Taylor, David. E. et al., "Dynamic Hardware Plugins (DHP): Exploiting Reconfigurable Hardware for High-Performance Programmable Routers", Computer Networks, 38(3):295-310(16), Feb. 21, 2002, and online at http:--www.cc.gatech.edu-classes-AY2007-cs8803hpc_fall-papers-dhplugins.pds.

Taylor, David E. et al., "Generalized RAD Module Interface Specification of the Field Programmable Port Extender (FPX) Version 2.0", Washington University, Department of Computer Science, Technical Report, WUCS-TM-01-15, Jul. 5, 2001, St. Louis, MO.

Yamaguchi et al., High Speed Homology Search with FPGAs, Proceedings of the Pacific Symposium on Biocomputing, Lihue, Hawaii, 7:271-282, Jan. 3, 2002, and online at: http:--psb.stanford.edu-psb-online-proceedings-psb02-yamaguchi.pdf.

Yan, Jeff et al., "Enhancing Collaborative Spam Detection with Bloom Filters", Proceedings of the 22nd Annual Computer Security Applications Conference (ACSAC '06), IEEEE, pp. 414-425, 2006.

Anonymous, "Method for Allocating Computer Disk Space to a File of Known Size", *IBM Technical Disclosure Bulletin*, vol. 27, No. 10B, New York, NY, Mar. 1, 1985.

Arnold, Jeffrey et al., "The Splash 2 Processor and Applications", *Proceedings of the 1993 IEEE International Conference on Computer Design: VLSI in Computers and Processors*, Oct. 3, 1993, pp. 482-485, Cambridge, Massachusetts.

Baer, Jean-Loup, *Computer Systems Architecture*, pp. 262-265, Computer Science Press, Rockville, MD, 1980.

Barone-Adesi, G. & Whaley, R., "Efficient Analytic Approximation of American Option Values", *Journal of Finance*, 42(2):301-320, Jun. 1987, U.S.A.

Behrens, Chris et al., "Blastin Redundancy Filter in Reprogrammable Hardware," Final Project Submission, Fall 2003, Department of Computer Science and Engineering, Washington University, St, Louis, MO.

Bonomi, Flavio et al., "Beyond Bloom Filters: From Approximate Membership Checks to Approximate State Machines", presented at SIGCOMM '06, Sep. 11-15, 2006, Pisa, Italy; *ACM SIGCOMM Computer Communication Review*, 36(4):315-326 (Oct. 2006) ISSN:0146-4833 or online at http://research.microsoft.com/users/rina/papers/sigcomm2006.pdf.

Chamberlain, Roger et al., "Achieving Real Data Throughput for an FPGA Co-Processor on Commodity Server Platforms", *Proceedings of the 1st Workshop on Building Block Engine Architectures for Computers and Networks*, Oct. 2004, Boston, MA.

Chaney, Tom et al., "Design of a Gigabit ATM Switch", *Proceedings IEEE*, 1:2-11, *INFOCOM '97, Sixteenth Annual Joint Conference of the IEEE Computer and Communications Societies*, Apr. 7-11, 1997, Kobe, Japan.

Choi, Sumi et al., "Design of a Flexible Open Platform for High Performance Active Networks", (Presentation Slides), Allerton Conference, Champaign, IL, 1999.

Cong, Jason & Ding, Yuzheng, "An Optimal Technology Mapping Algorithm for Delay Optimization in Lookup-Table Based FPGA Designs", *IEEE/ACM International Conference on Computer-Aided Design*, Santa Clara, CA, Digest of Technical Papers, pp. 48-53, Nov. 8, 1992.

Dharmapurikar, Sarang et al., "Deep Packet Inspection using Parallel Bloom Filters," *Symposium on High Performance Interconnects* (Holt), Stanford, California, 2003, pp. 1-8.

Donnet, Benoit et al., "Retouched Bloom Filters: Allowing Networked Applications to Trade Off Selected False Positives Against False Negatives", *International Conference On Emerging Networking Experiments And Technologies*, Proceedings of the 2006 ACM CoNEXT Conference, Lisbon, Portugal, Dec. 4-7, 2006, Article No. 13, ISBN:1-59593-456-1 and online at http://arxiv.org/PS_cache/cs/pdf/0607/0607038v2.pdf.

Ebeling, Carl et al., "RaPiD—Reconfiguration Pipelined Datapath", *FPL '96: The 6th International Workshop on Field-Programmable Logic and Applications*, Springer-Verlag, pp. 126-135, 2006; paper initially presented Sep. 23, 1996, Seattle, WA.

Feldmann, Anja, "BLT: Bi-Layer Tracing of HTTP and TCP/IP", *Computer Networks* 33(1):321-335, Jun. 2000; an earlier version of the paper was posted Nov. 1998.

Franklin, Mark et al., "An Architecture for Fast Processing of Large Unstructured Data Sets", *Proceedings of the 22nd International Conference on Computer Design*, pp. 280, 287, Washington, D.C., Oct. 11-13, 2004.

Gavrila, D.M., " Multi-feature Hierarchical Template Matching Using Distance Transforms", *Proceedings of the 14th International Conference on Pattern Recognition*, 1:439-444, Brisbane, Qld., AU, Aug. 16-20, 1998.

Gunther, Bernhard et al., "Assessing Document Relevance with Run-Time Reconfigurable Machines", *IEEE*, pp. 10-17, *Proceedings, IEEE Symposium on FPGAs for Custom Computing Machines*, Napa Valley, CA, Apr. 17, 1996.

Gyang, Kwame, "NCBI Blastin Stage 1 in Reconfigurable Hardware", *Technical Report WUCSE—2005-30*, Aug. 31, 2004, Department of Computer Science and Engineering, Washington University, St. Louis, MO.

Hao, Fang et al., "Building High Accuracy Bloom Filters using Partitioned Hashing", *ACM SIGMETRICS Performance Evaluation Review*, 35(1): 277-287, Jun. 2007.

Hayes, John P., *Computer Architecture and Organization*, Second Edition, 1988, pp. 448-459, McGraw-Hill, Inc., New York, NY, 1988.

Hezel, S. et al., FPGA-Based Template Matching using Distance Transforms, *Proceedings of the 10th Annual IEEE Symposium on Field-Programmable Custom Computing Machines*, Apr. 22, 2002, pp. 89-97, USA.

Johnson, Adam et al., "Pattern Matching in Reconfigurable Logic for Packet Classification", *International Conference on Compilers, Architecture, and Synthesis for Embedded Systems* (CASES), pp. 126-130, Nov. 16-17, 2001, Atlanta, Georgia, USA.

Kaya, Ilhan & Kocak, Taskin, "Increasing the Power Efficiency of Bloom Filters for Network String Matching", *IEEE International Symposium on Circuits and Systems (ISCAS)*, pp. 1828-1831, May 21-24, 2006, ISBN: 0-7803-9389-9.

Kefu, Xu et al., "Fast Dynamic Pattern Matching for Deep Packet Inspection", *IEEE International Conference on Networking, Sensing and Control* (Sanya, China), pp. 802-807, Apr. 6-8, 2008, manuscript received Sep. 20, 2007.

Krishnamurthy, Praveen et al., "Bioscience Similarity Search on the Mercury System", *IEEE, Proceedings of the 15th International Conference on Application-specific Systems, Architectures and Processors*, pp. 365-375, Galveston Island, Texas, Sep. 27-29, 2004.

Lancaster, Joseph et al., "Acceleration of Ungapped Extension in Mercury BLAST", Proceedings of the 7th Workshop on Media and Streaming Processors, 38th International Symposium on Microarchitecture, Barcelona, Spain, Nov. 12, 2005.

Lin, Ting-Pang et al., "Real-Time Image Template Matching Based on Systolic Amy Processor", *International Journal of Electronics*, Dec. 1, 1992, pp. 1165-1176, vol. 73, No. 6, London, Great Britain, paper received Feb. 8, 1992.

Madhusudan, Bharath et al., "Design of a System for Real-time Worm Detection", *Hot Interconnects*, pp. 77-83, Stanford, CA, Aug. 2004, found at http://www.hoti.org/hoti12/program/papers/2004/paper4.2.pdf.

Madhusudan, Bharath, "Design of a System for Real Time Worm Detection", Master's Thesis, Washington University, Dept. of Computer Science and Engineering, Saint Louis, MO, Aug. 2004.

Madhusudan, Bharath, "Design of a System for Real-time Worm Detection", Power Point presentation in support of Master's Thesis, Washington University, Dept. of Computer Science and Engineering, Saint Louis, MO, Aug. 2004.

Mao, Yun et al., "Cluster-based Online Monitoring System of Web Traffic", *Proceedings of the Third International Workshop on Web Information and Data Management (WIDM'2001)*, pp. 47-53, Atlanta, Georgia, Nov. 9, 2001.

Mosanya, Emeka et al., "A FPGA-Based Hardware Implementation of Generalized Profile Search Using Online Arithmetic", ACMISIGDA *International Symposium on Field Programmable Gate Arrays*, Feb. 21, 1999, pp. 101-111, Monterey, California.

Nunez, Jose Louis et al., "The X-MatchLITE FPGA-Based Data Compressor", *Euromicro Conference 1999 Proceedings*, Italy, Sep. 8-10, 1999.

Patent Cooperation Treaty, International Search Report for PCT/US01/11255, mailed Jul. 10, 2003.

Patent Cooperation Treaty, International Search Report for PCT/US02/33286, mailed Jan. 22, 2003.

Patent Cooperation Treaty, International Search Report for PCT/US03/15910, mailed Oct. 23, 2003.

Patent Cooperation Treaty, Annex to Form PCT/ISA/206 for PCT/US03/15638, mailed Feb. 3, 2004.

Patent Cooperation Treaty, International Search Report for PCT/US03/15638, mailed May 6, 2004.

Patent Cooperation Treaty, International Search Report for PCT/US2004/016398, mailed Apr. 12, 2005.

Patent Cooperation Treaty, International Search Report for PCT/US2004/016021, mailed Aug. 18, 2005.

Patent Cooperation Treaty, International Search Report for PCT/US05/30046, mailed Sep. 25, 2006.

Patent Cooperation Treaty, International Search Report for PCT/US2006/006105, mailed Feb. 5, 2007.

Patent Cooperation Treaty, International Search Report for PCT/US2007/060835, mailed Jul. 13, 2007.

PICMG, "AdvancedMC™ PICMG® AMC.0 R2.0 Short Form Specification", Dec. 28, 2006, Wakefield, MA, online at: http://www.picmg.org/pdf/AMC.0_R2.0_Short_Form.pdf.

PICMG, "MicroTCA™ PICMG® MTCA.0 R1.0 Micro Telecommunications Computing Architecture Short Form Specification", Sep. 21, 2006, Wakefield, MA, online at: http://www.picmg.org/pdf/MicroTCA_Short_Form_Sept_2006.pdf.

PICMG, "PICMG Open Modular Computing Specifications", Jun. 16, 2008, Wakefield, MA, Web page found at: http://www.picmg.org/v2internal/specifications.htm.

PMPublishing, "WebPOP: The Professional Options Package—Risk Management for Options Traders" Web pages retrieved on Feb. 13, 2006, from www.pmpublishing.com.

Ramakrishna, M.V. et al., "A Performance Study of Hashing Functions for Hardware Applications", *Journal of Computing and Information*, vol. 1, No. 1, May 1994, pp. 1621-1636.

Ramakrishna, M.V. et al., "Efficient Hardware Hashing Functions for High Performance Computers", IEEE Transactions on Computers 46(12):1378-1381, Dec. 1997.

Ratha, Nalini K., et al., "Convolution on Splash 2", *Proceedings of IEEE Symposium on FPGAs for Custom Computing Machines*, pp. 204-213, Los Alamitos, California, Apr. 19, 1995.

Rehman, Rafeeq Ur, "HP-Certified HP-UX System Administration", Prentice Hall PTR, Indianapolis, IN, May 31, 2000, from: http://proquest.safaribooksonline.com/0130183741.

Roberts, Lawrence, "Internet Still Growing Dramatically Says Internet Founder", *Press Release, Caspian Networks, Inc.*—Virtual Pressroom, PR Newswire, New York, NY Aug. 15, 2001.

Schmit, Herman, "Incremental Reconfiguration for Pipelined Applications", IEEE, 47-55, *Proceedings of the 5th Annual IEEE Symposium on FPGAs for Custom Computing Machines*, Apr. 1997.

Shalunov, Stanislav and Teitelbaum, Benjamin, "TCP Use and Performance on Internet2", *ACM SIGCOMM Internet Measurement Workshop 2001*, San Francisco, CA Nov. 1-2, 2001.

Shirazi, N. et al., "Quantitative Analysis of FPGA-Based Database Searching", *Journal of VLSI Signal Processing*, May 2001, pp. 85-96, vol. 28, No. 112, Dordrecht, Netherlands.

Singh, Sumeet et al., "The EarlyBird System for Real-time Detection of Unknown Worms", *Technical Report CS2003-0761*, Aug. 2003.

Taylor and Turner, "Scalable Packet Classification using Distributed Crossproducting of Field Labels", *Proceedings of IEEE Infocom*, vol. 20, No. 1, Mar. 2005, pp. 269-280.

Taylor, David and Lockwood, John., "Modular Design Techniques for the FPX", Field Programmable Port Extender: Jan. 2002 *Gigabit Worshop Tutorial*, Washington University, St. Louis, MO, Jan. 3-4, 2002.

Taylor, David, "Models, Algorithms, and Architectures for Scalable Packet Classification", doctoral thesis, Department of Computer Science and Engineering, Washington University, St. Louis, MO, Aug. 2004.

Villasenor, John et al., "Configurable Computing Solutions for Automatic Target Recognition", *Proceedings of IEEE Symposium on FPGAs for Custom Computing Machines*, Apr. 17, 1996, pp. 70-79, Los Alamitos, California.

Waldvogel, Marcel et al., "Scalable High-Speed Prefix Matching", *ACM Transactions on Computer Systems*, 19(4):440-482, Nov. 2001.

Ward, Brent D. & Snavely, Allan E., "Dynamically Reconfigurable Computing: A Novel Computation Technology with Potential to Improve National Security Capabilities by Dramatically Improving High-End Computing", White Paper prepared by Star Bridge Systems, Inc., May 15, 2003, found at: http:/www.starbridgesystems/resources/whitepapers/Dynamically%20/Reconfigurable%20Computing.pdf.

Weaver, N. et al., "Very Fast Containment of Scanning Worms", *Proceedings USENIX Security Symposium 2004*, San Diego, CA, Aug. 2004, located ot http://www.icsi.berkeley.edu/~nweaver/containment/containment.pdf.

Wooster, et al., "HTTPDUMP Network HTTP Packet Snooper", Apr. 25, 1996, available at http://ei.cs.vt.edu/~succeed/96httpdump/html/paper.html.

Yardley, J. et al., "A Reconfigurable Computing Model for Biological Research Application of Smith-Waterman Analysis to Bacterial Genomes", A White Paper prepared by Star Bridge Systems, Inc., Copyright 2005, available at http:/www.starbridgesystems/resources/whitepapers/Smith%20/Waterman%20Whitepaper. pdf (Poster presentation with same title given by same authors at ERSA '04 on Jun. 21, 2004).

Attig, Michael et al., "Implementation Results of Bloom Filters for String Matching", *Proceedings of: IEEE Symposium on Field-Programmable Custom Computing Machines (FCCM)*, Napa, CA, Apr. 20-23, 2004.

Bossardt, Matthias et al., "ABR Architecture and Simulation for an Input-Buffered and Per-VC Queued ATM Switch", *IEEE Global Telecommunications Conference (Globecom'98)*, pp. 1817-1822, Sydney, Australia, Nov. 1998.

Braun, Florian et al., "Layered Protocol Wrappers for Internet Packet Processing in Reconfigurable Hardware", Washington University, Department of Computer Science, Technical Report WUCS-01-10, Jul. 2001, *Proceedings of Hot Interconnects 9 (Hotl-9)*, Stanford, CA, Aug. 22-24, 2001, pp. 93-98.

Braun, Florian et al., "Protocol Wrappers for Layered Network Packet Processing in Reconfigurable Hardware", *IEEE Micro*, vol. 22, No. 3, pp. 66-74, Feb. 2002.

Dharmapurikar, Sarang et al., "Synthesizable Design of a Multi-Module Memory Controller", Washington University, Dept. of Computer Science, *Technical Report WUCS-01-26*, Oct. 12, 2001.

Duan, Haoran et al., "A High-performance OC-12/OC-48 Queue Design Prototype for Input-buffered ATM Switches", *IEEE Infocom '97*, pp. 20-28, Kobe, Japan, Apr. 7-11, 1997.

Horta, Edson L. et al., "Automated Method to Generate Bitstream Intellectual Property Cores for Virtex FPGAs", 14th International Conference on Field Programmable Logic and Applications (FPL), Springer LNCS 3203, Antwerp, Belgium, Aug. 2004, pp. 975-979.

Horta, Edson L. et al., "Dynamic Hardware Plugins in an FPGA with Partial Run-time Reconfiguration", Design Automation Conference (DAC), New Orleans, LA, Jun. 10-14, 2002.

Horta, Edson L. et al., Implementing a Dynamically Reconfigurable ATM Switch on the VIRTEX FPGA of the FPX Platform, *Proceedings of SPIE*, vol. 4867, Boston, MA, Jul. 30, 2002.

Horta, Edson L. et al., "PARBIT: A Tool to Transform Bitfiles to Implement Partial Reconfiguration of Field Programmable Gate Arrays (FPGAs)", Washington University, Department of Computer Science, Technical Report WUCS-01-13, Jul. 6, 2001.

Jones, Phillip et al., "Liquid Architecture", *International Parallel and Distributed Processing Symposium: Workshop on Next Generation Software (NSF-NGS)*, Santa Fe, NM, Apr. 26, 2004, Paper: W10-NSFNGS-13.

Kuhns, Fred et al., "Design of a High Performance Dynamically Extensible Router", *DARPA Active Networks Conference and Exposition (DANCE)*, San Francisco, CA, May 2002.

Kuhns, Fred et al., "Implementation of an Open Multi-Service Router", Washington University, Department of Computer Science, Technical Report WUCS-01-20, Aug. 15, 2001.

Lockwood, John W. et al., "An Extensible, System-On-Programmable-Chip, Content-Aware Internet Firewall", *Field Programmable Logic and Applications (FPL)*, Lisbon, Portugal, Paper 14B, Sep. 1-3, 2003.

Lockwood, John W. et al., "Application of Hardware Accelerated Extensible Network Nodes for Internet Worm and Virus Protection", International Working Conference on Active Networks (IWAN), Kyoto, Japan, Dec. 2003.

Lockwood, John W. et al., "Field Programmable Port Extender (FPX) User Guide: Version 2.2", Washington University, Department of Computer Science and Engineering, *Technical Report WUCSE-02-15*, Jun. 18, 2002.

Lockwood, John W. et al., "Internet Worm and Virus Protection in Dynamically Reconfigurable Hardware", *Military and Aerospace Programmable Logic Device (MAPLD)*, Washington DC, 2003, Paper E10, Sep. 9-11, 2003.

Lockwood, John William, "Design and Implementation of a Multicast, Input-Buffered ATM Switch for the iPOINT Testbed", PhD Dissertation, Department of Electrical and Computer Engineering, University of Illinois at Urbana-Champaign, UMI No. 9625160, 1995.

Lockwood, John W., Project History and Previous Research on the Illinois Input Queue and WUGS/iiQueue Integration, Aug. 1998.

Lockwood, John W., Quality of Service Enhancement of Washington University Gigabit Switch Using the Illinois Input Queue, Dec. 1996, Urbana and Champaign, IL.

Moscola, James et al., "Implementation of a Content-Scanning Module for an Internet Firewall", *FCCM*, Napa, CA, Apr. 9-11, 2003.

Padmanabhan, Shobana et al., "Extracting and Improving Microarchitecture Performance on Reconfigurable Architectures", *Workshop on Compilers and Tools for Constrained Embedded Systems (CTCES)*, Washington, DC, Sep. 22, 2004.

Schuehler, David V. et al., "A Modular System for FPGA-based TCP Flow Processing in High-Speed Networks", *14th International Conference on Field Programmable Logic and Applications (FPL)*, Springer LNCS 3203, Antwerp, Belgium, Aug. 2004, pp. 301-310.

Schuehler, David Vincent, "Techniques for Processing TCP/IP Flow Content in Network Switches at Gigabit Line Rates", Doctorial Thesis, Washington University in St. Louis, MO, *Technical Report: WUCSE-2004-72*, Nov. 22, 2004.

Sinclair, Eliot I. et al., "Multiflow TCP, UDP, IP, and ATM Traffic Generation Module", WUCSE-2003-24, Apr. 24, 2003.

Song, Haoyu et al., "Secure Remote Control of Field-programmable Network Devices", *Proceedings of: IEEE Symposium on Field-Programmable Custom Computing Machines (FCCM)*, Napa, CA, Apr. 20-23, 2004.

Sproull, Todd et al., "Control and Configuration Software for a Reconfigurable Networking Hardware Platform", *IEEE Symposium on Field-Programmable Custom Computing Machines, (FCCM)*, Napa, CA, Apr. 24, 2002.

Sproull, Todd et al., "Wide-area Hardware-accelerated Intrusion Prevention Systems (WHIPS)", *International Working Conference on Active Networking (IWAN)*, Oct. 27-29, 2004, Lawrence, Kansas, USA.

Taylor, David et al., "Scalable IP Lookup for Internet Routers", *IEEE Journal on Selected Areas in Communications (JSAC)*, vol. 21, No. 4, May 2003, pp. 522-534 (Journal version of IEEE Infocom 2002 paper).

Taylor, David et al., "Scalable IP Lookup for Programmable Routers", *IEEE Infocom 2002*, New York NY, Jun. 23-27, 2002.

Taylor, David et al., "Scalable IP Lookup for Programmable Routers", Washington University, Department of Computer Science, *Technical Report WUCS-01-33* Oct. 1, 2001.

Taylor, David et al., "System-on-Chip Packet Processor for an Experimental Network Services. Platform", *Proceedings of IEEE Globecom 2003*, Dec. 2003.

"Announcing the Advanced Encryption Standard (AES)"; Nov. 26, 2001; U.S. Dept of Commerce/Nat'l Institute of Standards and Technology, Federal Information Processing Standards Publication 197, retrieved from website: http://csrc.nist.gov/publications/fips/fips197/fips-197.pdf.

"Data Encryption Standard (DES)"; Reaffirmed Oct. 25, 1999; U.S. Dept of Commerce/Nat'l Institute of Standards and Technology, Federal Information Processing Standards Publication FIPS PUB 46-3; retrieved from website: http://csrc.nist.gov/publications/fips/fips46-3/fips46-3.pdf.

Altschul, Stephen F., "Basic Local Alignment Search Tool", *Journal of Molecular Biology*, 215(3):403-410, Oct. 5, 1990.

Cavnar, William B. et al., "N-Gram-Based Text Categorization", *Proceedings of SDAIR-94, 3$^{rd}$ Annual Symposium on Document Analysis and Information Retrieval*, Las Vegas, pp. 161-175, 1994.

Chenna, Ramu; "Multiple sequence alignment with the Clustal series of programs"; 2003; Nucleic Acids Research, vol. 31, No. 13, pp. 3497-3500; received Jan. 24, 2003; revised and accepted Mar. 4, 2003.

Cho, Young et al.; "Deep Packet Filter with Dedicated Logic and Read Only Memories"; Apr. 2004; Proceedings of the 12th Annual IEEE Symposium on Field-Programmable Custom Computing Machines (FCCM'04), Napa, CA, USA.

Chodowiec, Pawel et al.; "Fast implementations of secret-key block ciphers using mixed inner and outer-round pipelining"; Feb. 11-13, 2001; ACM SIGDA International Symposium on Field Programmable Gate Arrays, FPGA '01, Monterey, CA.

Cholleti; "Storage Allocation in Bounded Time"; Dec. 2002; MS Thesis, Dept. of Computer Science and Engineering, Washington University, St. Louis, MO; Available as Washington University Technical Report WUCSE-2003-2.

Clark, Christopher et al.; "Scalable Pattern Matching for High Speed Networks"; Apr. 2004; Proceedings of the 12th Annual IEEE Symposium on Field-Programmable Custom Computing Machines (FCCM'04), Napa, CA, USA.

Compton, Katherine et al.; "Configurable Computing: A Survey of Systems and Software"; 1999; Northwestern University, Dept. of ECE, Technical Report, XP002315148, Evanston, Illinois.

Cong, et al.; "An Optimal Technology Mapping algorithm for Delay Optimization in Lookup-Table Based FPGA Designs"; 1992; IEEE, pp. 48-53.

Denoyer, Ludovic et al.; "HMM-based Passage Models for Document Classification and Ranking"; Mar. 16, 2001; 23rd BCS European Annual Colloquium on Information Retrieval, Darmstadt, Germany.

Dharmapurikar, et al.; "Deep Packet Inspection using Parallel Bloom Filters"; Jan.-Feb. 2004; IEEE Micro, vol. 24, Issue 1, pp. 52-61.

Edgar, Robert C.; "Muscle: multiple sequence alignment with high accuracy and high throughput"; received Jan. 19, 2004, revised Jan. 30, 2004; accepted Feb. 24, 2004; Nucleic Acids Research, 2004, vol. 32, No. 5, pp. 1792-1797.

Forgy, Charles L., "Rete: A Fast Algorithm for the Many Pattern/Many Object Pattern Match Problem", *Artificial Intelligence*, 19:17-37, 1982, North Holland; received May 1980, revised version received Apr. 1981.

Franklin, R. et al.; "Assisting Network Intrusion Detection with Reconfigurable Hardware"; Preliminary Proceedings Apr. 2001 to appear in FCCM '02, Apr. 22-24, 2002; IEEE Symposium on Field-Programmable Custom Computing Machine, Napa, CA, USA.

Guerdoux-Jamet et al.; "Systolic Filter for Fast DNA Similarity Search"; Jul. 1995; IEEE International Conference on Application-Specific Array Processors, pp. 145-156, Strasbourg, France.

Halaas, Arne et al.; "A Recursive MISD Architecture for Pattern Matching"; Apr. 2003, appeared Jul. 2004 in the IEEE Transactions on Very Large Scale Integration (VLSI) Systems, vol. 12, No. 7, pp. 727-734.

Hoinville, Jay R. et al., "Spatial Noise Phenomena of Longitudinal Magnetic Recording Media", *IEEE Transactions on Magnetics*, vol. 28, No. 6, Nov. 1992, New York, NY.

Hutchings, B.L. et al., "Assisting Network Intrusion Detection with Reconfigurable Hardware"; 2002; Proceedings of the 10th Annual IEEE Symposium on Field-Programmable Custom Computing Machines (FCCM'02).

Jeanmougin, François et al., "Multiple sequence alignment with Clustal X", *Trends in Biochemical Sciences*, 23(10): 403-405, Oct. 1, 1998, Elsevier Science Ltd.

Jones, K. Sparck et al., "A probabilistic model of information retrieval: development and status", *Information Processing and Management*, 36(6):779-840, Cambridge, UK, Aug. 1998.

Jung, Bongjin et al., "Efficient VLSI for Lempel-Ziv Compression in Wireless Data Communication Networks", *IEEE Transactions on VLSI Systems*, 6(3):475-483, Sep. 1998, Institute of Electrical and Electronics Engineers, Washington, DC.

Patent Cooperation Treaty, International Search Report for PCT/US2007/075723, Mailed Jul. 25, 2008.

Patent Cooperation Treaty, International Search Report for PCT/US2008/065955, Mailed Aug. 22, 2008.

Patent Cooperation Treaty, International Search Report for PCT/US2008/066929, Mailed Aug. 29, 2008.

Pirsch, Peter, et al., "VLSI Architectures for Video Compression-A Survey", *Proceedings of the IEEE*, 83(2):220-246, Feb. 1995, Institute of Electrical and Electronics Engineers, Washington, DC.

Ranganathan, N. et al., "High-speed VLSI Designs for Lempel-Ziv-Based Data Compression", *IEEE Transactions on Circuits and Systems II: Analog and Digital Signal Processing*, 40(2):96-106, Feb. 1993, Institute of Electrical and Electronics Engineers, Washington, DC.

Ratha, Nalini K. et al., "FPGA-based coprocessor for text string extraction", *Proceedings. Fifth IEEE International Workshop on Computer Architectures for Machine Perception*, Padova, Italy, Sep. 11-13, 2000, pp. 217-221.

Roesch, Martin, "Snort—Lightweight Intrusion Detection for Networks", *Proceedings of LISA '99*: 13th Systems Administration Conference, pp. 229-238, Seattle, WA, Nov. 7-12, 1999.

Roy, Kaushik, "A Bounded Search Algorithm for Segmented Channel Routing for FPGA'S and Associated Channel Architecture Issues", *IEEE Transactions on Computer-Aided Design of Integrated Circuits and Systems*, 12(11):1695-1705, Nov. 1993.

Sourdis, Ioannis, et al.; "Fast, Large-Scale String Match for a 10Gbps FPGA-based Network Intrusion Detection System"; 2005; Chapter 16 in "New Algorithms, Architectures, and Applications for Reconfigurable Computing", Patrick Lysaght and Wolfgang Rosenstiel (eds.) pp. 195-207, ISBN 1-4020-3127-0, Springer-Verlag, pp. 1-10.

Sourdis, et al.; "Fast, Large-Scale String Match for a 10 Gbps FPGA-based Network Intrusion Detection System"; 2003; 13th International Conference on Field Programmable Logic and Applications.

Steinbach, Michael et al.; "A Comparison of Document Clustering Techniques"; Aug. 2000; ACM SIGKDD International Conference on Discovery and Data Mining; Boston, MA, USA, pp. 1-20.

Thompson, Julie D. et al., "The CLUSTAL_X windows interface: flexible strategies for multiple sequence alignment aided by quality analysis tools", *Nucleic Acids Research*, 25(24):4876-4882, Dec. 15, 1997; received Sep. 24, 1997; revised and accepted Oct. 28, 1997.

Ward, et al.; "Dynamically Reconfigurable Computing: A Novel Computation Technology with Potential to Improve National Security Capabilities by Dramatically Improving High-End Computing"; May 15, 2003; A White Paper Prepared by Star Bridge Systems, Inc. [retrieved Dec. 12, 2006]; retrieved from the Internet: <URL: http://www.starbridgesystems.com/resources/whitepapers/Dynamically%20Reconfigurable%20Computing.pdf.

Ziv, Jacob et al.; "A Universal Algorithm for Sequential Data Compression"; May 1977; IEEE Transactions on Information Theory, vol. IT-23, No. 3, pp. 337-343.

Ziv, Jacob et al. "Compression of Individual Sequences via Variable-Rate Coding"; Sep. 1978; IEEE Transactions on Information Theory, vol. IT-24, No. 5, pp. 530-536.

"Field Programmable Port Extender"; Jan. 3-4, 2002; Gigabit Workshop Tutorial, Washington University, St. Louis, MO, pp. 1-4.

"The Field-Programmable Port Extender (FPX)"; downloaded from http://www.arl.wustl.edu/arl in Mar. 2002.

Invitation to Pay Additional Fees and Annex to Form PCT/ISA/206 Communication Relating to the Results of the Partial International Search for International Application No. PCT/US2003/015368, said Invitation and Annex dated Feb. 3, 2004.

* cited by examiner

METHOD AND SYSTEM FOR PERFORMING LONGEST PREFIX MATCHING FOR NETWORK ADDRESS LOOKUP USING BLOOM FILTERS

This application claims the benefit of the filing date of U.S. Provisional Application No. 60/543,222, entitled "Method And Apparatus For Performing Longest Prefix Matching For In Packet Payload Using Bloom Filters," filed on Feb. 9, 2004, which is incorporated herein by reference to the extent allowable by law.

BACKGROUND OF THE INVENTION

The present invention relates to network communication routing and, in particular, to a method and system of performing longest prefix matching for network address lookup using Bloom filters.

Longest Prefix Matching (LPM) techniques have received significant attention due to the fundamental role LPM plays in the performance of Internet routers. Classless Inter-Domain Routing (CIDR) has been widely adopted to prolong the life of Internet Protocol Version 4 (IPv4). This protocol requires Internet routers to search variable-length address prefixes in order to find the longest matching prefix of the network destination address of each product traveling through the router and retrieve the corresponding forwarding information. This computationally intensive task, commonly referred to as network address lookup, is often the performance bottleneck in high-performance Internet routers due to the number of off-chip memory accesses required per lookup.

Although significant advances have been made in systemic LPM techniques, most commercial router designers use Ternary Content Addressable Memory (TCAM) devices in order to keep pace with optical link speeds despite their larger size, cost, and power consumption relative to Static Random Access Memory (SRAM).

However, current TCAMs are less dense than SRAM, and have access times of 100 M random accesses per second, which are over 3.3 times slower than SRAMs (which are capable of performing 333,000,000 random accesses per second) due to the capacitive loading induced by their parallelism. Further, power consumption per bit of storage is four orders of magnitude higher than SRAM.

Techniques such as the Trie-based systems, Tree Bitmap, Multiway and Multicolumn Search, and Binary Search on Prefix Length techniques may make use of commodity SRAM and SDRAM devices. However, these techniques have not met the criteria to provide advantages in performance that are independent of IP address length or to provide improved scalability.

Therefore, a need exists for a method and system that overcome the problems noted above and others previously experienced.

SUMMARY OF THE INVENTION

Methods and systems consistent with the present invention employ Bloom filters for Longest Prefix Matching. Bloom filters, which are efficient data structures for membership queries with tunable false positive errors, are typically used for efficient exact match searches. The probability of a false positive is dependent upon the number of entries stored in the filter, the size of the filter, and the number of hash functions used to probe the filter. Methods consistent with the present invention perform a network address lookup by sorting forwarding table entries by prefix length, associating a Bloom filter with each unique prefix length, and "programming" each Bloom filter with prefixes of its associated length. A network address lookup search in accordance with methods consistent with the present invention begins by performing parallel membership queries to the Bloom filters by using the appropriate segments of the input IP address. The result of this step is a vector of matching prefix lengths, some of which may be false matches. A hash table corresponding to each prefix length may then be probed in the order of longest match in the vector to shortest match in the vector, terminating when a match is found or all of the lengths represented in the vector are searched.

One aspect of the present invention is that the performance, as determined by the number of dependent memory accesses per lookup, may be held constant for longer address lengths or additional unique address prefix lengths in the forwarding table given that memory resources scale linearly with the number of prefixes in the forwarding table.

Methods consistent with the present invention may include optimizations, such as asymmetric Bloom filters that dimension filters according to prefix length distribution, to provide optimal average case performance for a network address lookup while limiting worst case performance. Accordingly, with a modest amount of embedded RAM for Bloom filters, the average number of hash probes to tables stored in a separate memory device approaches one. By employing a direct lookup array and properly configuring the Bloom filters, the worst case may be held to two hash probes and one array access per lookup while maintaining near optimal average performance of one hash probe per lookup.

Implementation with current technology is capable of average performance of over 300 M lookups per second and worst case performance of over 100 M lookups per second using a commodity SRAM device operating at 333 MHz. Methods consistent with the present invention offer better performance, scalability, and lower cost than TCAMs, given that commodity SRAM devices are denser, cheaper, and operate more than three times faster than TCAM-based solutions.

Specifically, in accordance with methods consistent with the present invention, a method of performing a network address lookup is provided. The method comprises: grouping forwarding entries from a routing table by prefix length; associating each of a plurality of Bloom filters with a unique prefix length; programming said plurality of Bloom filters with said associated set of prefixes; and performing membership probes to said Bloom filters by using predetermined prefixes of a network address.

In accordance with systems consistent with the present invention, a system is provided for performing a network address lookup. The system comprises means for sorting forwarding entries from a routing table by prefix length, means for associating each of a plurality of Bloom filters with a unique prefix length, means for programming said plurality of Bloom filters with said associated set of prefixes, and means for performing membership queries to said Bloom filters by using predetermined prefixes of an network address.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

DETAILED DESCRIPTION OF THE INVENTION

Methods consistent with the present invention employ a LPM technique that provides better performance and scalability than conventional TCAM-based techniques for IP network address lookup. The present invention exhibits several advantages over conventional techniques, since the number of dependent memory accesses required for a lookup is virtually independent of the length of the IP network address and the number of unique prefix lengths (in other words, statistical performance may be held constant for arbitrary address lengths provided ample memory resources). Scaling the present invention to IPv6 does not degrade lookup performance and requires more on-chip memory for Bloom filters only if the number of stored unique prefix lengths increases. Although logic operations and accesses to embedded memory increase operating costs, the amount of parallelism and embedded memory employed by the present invention are well within the capabilities of modern Application-Specific Integrated Circuit ("ASIC") technology. Finally, by avoiding significant precomputation, such as typically exhibited using a known "leaf pushing" technique, the present invention is able to retain its network address lookup performance even when the network prefix databases are incrementally updated.

Figure 1:
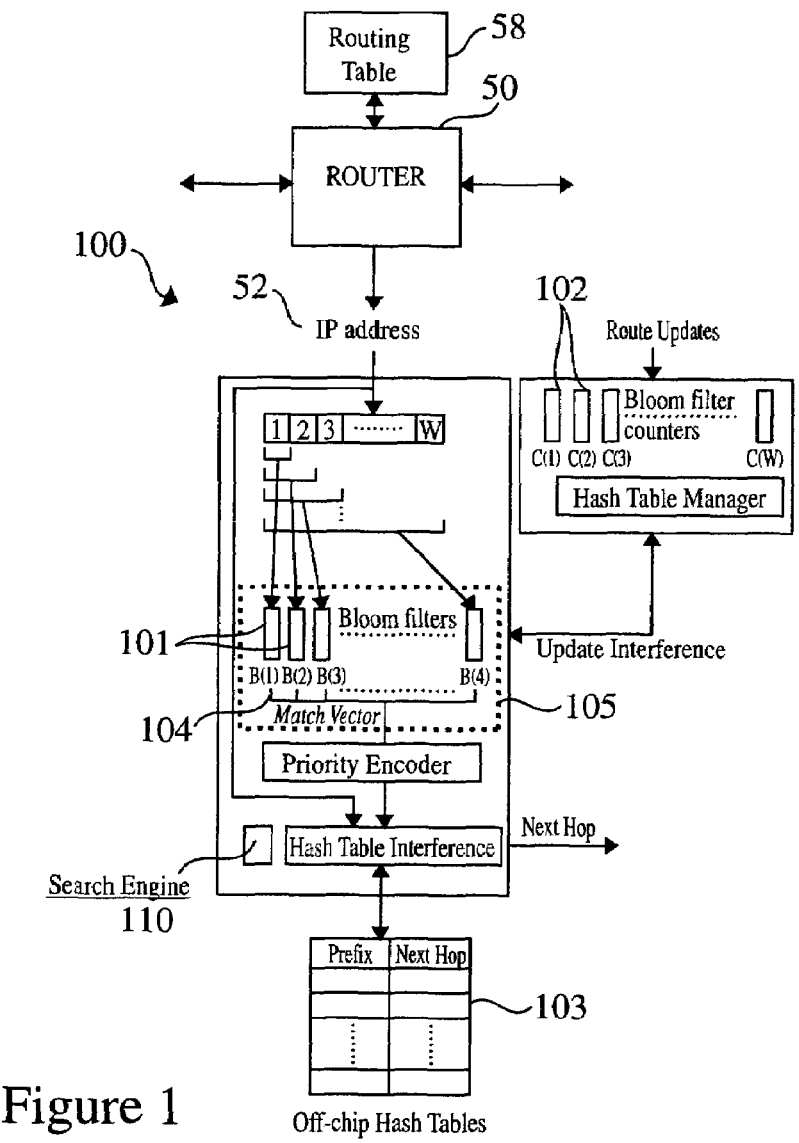
FIG. 1 depicts an exemplary system for performing longest prefix matching using Bloom filters according to one embodiment consistent with the present invention.

FIG. 1 depicts an exemplary system 100 consistent with the present invention for performing a network address lookup using longest prefix matching that employs Bloom filters. In the implementation shown in FIG. 1, the system 100 is operatively connected to a router 50 to receive an IP address 50, such as a destination network address, from a packet payload (not shown in figures) that is being traversed through the router 50. In one implementation, the system 100 may be incorporated into the router 50. The system 100 includes a group of Bloom filters 101 that are operatively configured to determine IP network address prefix memberships in sets of prefixes that are sorted by prefix length. The system 100 may also include a group of Counting Bloom filters 102 each of which are operatively connected to a respective Bloom filter 101 and a hash table 103, preferably an off-chip hash table, that is operatively connected to the Bloom filters 101. As discussed below, a network address lookup search executed by the system 100 in accordance with methods consistent with the present invention begins by performing parallel membership queries to the Bloom filters 101, which are organized by prefix length. The result is a vector 104 in FIG. 1 of matching prefix lengths, some of which may be false matches. The hash table 103 has all the prefixes in the routing table and is operatively configured to be probed in order of the longest match in the vector 104 to the shortest match in the vector 104, terminating when a match is found or all of the lengths represented in the vector are searched. In one implementation, the hash table 103 may be one of a multiple of hash tables, each containing prefixes of a particular length, operatively configured to be probed. For a modest amount of on-chip resources for Bloom filters 101, the expected number of off-chip memory accesses required by the system 100 per network address lookup approaches one, providing better performance, scalability, and lower cost than TCAMs, given that commodity SRAM devices are denser, cheaper, and operate more than three times faster than TCAM-based solutions.

In general, each Bloom filter 101 is a data structure used for representing a set of messages succinctly (See B. Bloom, in "Space/time trade-offs in hash coding with allowable errors", *ACM*, 13(7):422-426, May 1970). Each Bloom filter 101 includes a bit-vector of length m used to efficiently represent a set of messages, such as IP addresses that the router 50 may be expected to receive in a packet payload. Given a set of messages X with n members, for each message $x_i$ in X, the Bloom filter 101 may compute k hash functions on $x_i$, producing k hash values each ranging from 1 to m. Each of these values address a single bit in the m-bit vector, hence each message $x_i$ causes k bits in the m-bit long vector to be set to 1. Note that if one of the k hash values addresses a bit that is already set to 1, that bit is not changed. This same procedure is repeated for all the members of the set, and is referred to herein as "programming" the Bloom filter.

Querying the Bloom filters 101 for membership of a given message x in the set of messages is similar to the programming process. Given message x, the Bloom filter generates k hash values using the same hash functions it used to program the filter. The bits in the m-bit long vector at the locations corresponding to the k hash values are checked. If at least one of these k bits is 0, then the message is declared to be a non-member of the set of messages. If all the k bits are found to be 1, then the message is said to belong to the set with a certain probability. If all the k bits are found to be 1 and x is not a member of X, then it is said to be a false positive. This ambiguity in membership comes from the fact that the k bits in the m-bit vector may be set by any of the n members of X. Thus, finding a bit set to 1 does not necessarily imply that it was set by the particular message being queried. However, finding a 0 bit certainly implies that the string does not belong to the set, since if it were a member then all the k bits would definitely have been set to 1 when the Bloom filter 103 was programmed with that message.

In the derivation of the false positive probability (i.e., for a message that is not programmed, all k bits that it hashes to are 1), the false probability that a random bit of the m-bit vector is set to 1 by a hash function is simply $1/m$. The probability that it is not set is $1-(1/m)$. The probability that it is not set by any of the n members of X is $(1-(1/m))^n$. Since each of the messages sets k bits in the vector, it becomes $(1-(1/m))^{nk}$. Hence, the probability that this bit is found to be 1 is $1-(1-(1/m))^{nk}$. For a message to be detected as a possible member of the set, all k bit locations generated by the hash functions need to be 1. The probability that this happens, $f$, is given by:

$$f = (1-(1-(1/m))^{nk})^k \quad (1)$$

For large values of m, the above equation approaches the limit:

$$f \approx (1-e^{(-nk/m)})^k \quad (2)$$

This explains the presence of false positives in this scheme, and the absence of any false negatives.

Because this probability is independent of the input message, it is termed the "false positive" probability. The false positive probability may be reduced by choosing appropriate values for m and k for a given size of the member set, n. It is clear that the size of the bit-vector, m, needs to be quite large compared to the size of the message set, n. For a given ratio of m/n, the false positive probability may be reduced by increasing the number of hash functions, k. In the optimal case, when false positive probability is minimized with respect to k, the following relationship is obtained:

$$k = \left(\frac{m}{n}\right) \ln 2 \quad (3)$$

The ratio m/n may be interpreted as the average number of bits consumed by a single member of the set of messages. It should be noted that this space requirement is independent of the actual size of the member. In the optimal case, the false positive probability is decreased exponentially with a linear increase in the ratio m/n. In addition, this implies that the number of hash functions k, and hence the number of random lookups in the bit vector required to query membership of one message in the set of messages is proportional to m/n.

The false positive probability at this optimal point (i.e., false positive probability ratio) is:

$$f = \left(\frac{1}{2}\right)^k \quad (4)$$

If the false positive probability is to be fixed, then the amount of memory resources, m, needs to scale linearly with the size of the message set, n.

One property of Bloom filters is that it is not possible to delete a member stored in the filter. Deleting a particular message entry from the set programmed into the Bloom filter 103 requires that the corresponding k hashed bits in the bit vector (e.g., vector 104) be set to zero. This could disturb other members programmed into the Bloom filter which hash to (or set to one) any of these bits.

To overcome this drawback, each Counting Bloom filter 102 has a vector of counters corresponding to each bit in the bit-vector. Whenever a member or message (e.g., IP address 52 prefix) is added to or deleted from the set of messages (or prefixes) programmed in the filter 102, the counters corresponding to the k hash values are incremented or decremented, respectively. When a counter changes from zero to one, the corresponding bit in the bit-vector is set. When a counter changes from one to zero, the corresponding bit in the bit-vector is cleared.

The counters are changed only during addition and deletion of prefixes in the Bloom filter. These updates are relatively less frequent than the actual query process itself. Hence, counters may be maintained in software and the bit corresponding to each counter is maintained in hardware. Thus, by avoiding counter implementation in hardware, memory resources may be saved.

An important property of Bloom filters is that the computation time involved in performing the query is independent from the number of the prefixes programmed in it, provided, as stated above, that the memory m used by the data structure varies linearly with the number of strings n stored in it. Further, the amount of storage required by the Bloom filter for each prefix is independent from its length. Still further, the computation, which requires generation of hash values, may be performed in special purpose hardware.

The present invention leverages advances in modern hardware technology along with the efficiency of Bloom filters to perform longest prefix matching using a custom logic device with a modest amount of embedded SRAM and a commodity off-chip SRAM device. A commodity DRAM (Dynamic Random Access Memory) device could also be used, further reducing cost and power consumption but increasing the "off-chip" memory access period. In the present invention, by properly dimensioning the amount and allocation of embedded memory for Bloom filters 101, the network address lookup performance is independent of address length, prefix length, and the number of unique prefix lengths in the database, and the average number of "off-chip" memory accesses per lookup approaches one. Hence, lookup throughput scales directly with the memory device access period.

In one implementation, the plurality of IP address 52 prefixes (e.g., forwarding prefixes) from a routing table 58 in FIG. 1 that are expected to be received by the system are grouped into sets according to prefix length. As shown in FIG. 1, the system 100 employs a set of W Bloom filters 101, where W is the number of unique prefix lengths of the prefixes in the routing table, and associates one filter 101 with each unique prefix length. In one embodiment, the Bloom filters 101 are Counting Bloom filters. Each filter 101 is "programmed" with the associated set of prefixes according to the previously described procedure.

Although the bit-vectors associated with each Bloom filter 101 are stored in embedded memory 105, the counters 102 associated with each filter 101 may be maintained, for example, by a separate control processor (not shown in figures) responsible for managing route updates. Separate control processors with ample memory are common features of high-performance routers.

The hash table 103 is also constructed for all the prefixes where each hash entry is a [prefix, next hop] pair. Although it is assumed, for example, that the result of a match is the next hop for the packet being traversed through the router 50, more elaborate information may be associated with each prefix if desired. As mentioned above, the hash table 103 may be one of a group of hash tables each containing the prefixes of a particular length. However, a single hash table 103 is preferred. The single hash table 103 or the set of hash tables 103 may be stored off-chip in a separate memory device; for example, a large, high-speed SRAM.

Using the approximation that probing a hash table 103 stored in off-chip memory requires one memory access, minimizing the number of hash probes per lookup is described as follows.

A network address lookup search executed by the system 100 in accordance with methods consistent with the present invention may proceed as follows. The input IP address 52 is used to probe the set of W Bloom filters 101 in parallel. The one-bit prefix of the address 52 is used to probe the respective filter 101 associated with length one prefixes, the two-bit prefix of the address is used to probe the respective filter 101 associated with length two prefixes, and so on. Each filter 101 indicates a "match" or "no match." By examining the outputs of all filters 101, a vector 104 of potentially matching prefix lengths for the given address is composed, referenced herein as the "match vector."

For example, for packets following IPv4, when the input address produces matches in the Bloom filters 101 associated with prefix lengths 8, 17, 23, and 30; the resulting match vector would be [8,17,23,30]. Bloom filters may produce false positives, but never produce false negatives; therefore, if a matching prefix exists in the database, it will be represented in the match vector.

The network address lookup search executed by the system 100 in accordance with methods consistent with the present invention then proceeds by probing the hash table 103 with the prefixes represented in the vector 104 in order from the longest prefix to the shortest until a match is found or the vector 104 is exhausted.

The number of hash probes required to determine the correct prefix length for an IP address is determined by the number of matching Bloom filters 101. In one implementation of system 100, all Bloom filters 101 are tuned to the same false positive probability, $f$. This may be achieved by selecting appropriate values for m for each filter 101. Let $B_l$ represent the number of Bloom filters 101 for the prefixes of length greater than l. The probability P that exactly i filters associated with prefix lengths greater than l will generate false positives is given by:

$$P_l = \binom{B_l}{i} f^i (1-f)^{B_l - i} \quad (5)$$

For each value of i, i additional hash probes are required. Hence, the expected number of additional hash probes required when matching a length l prefix is:

$$E_l = \sum_{i=1}^{B_l} i \binom{B_l}{i} f^i (1-f)^{B_l - i} \quad (6)$$

which is the mean for a binomial distribution with $B_l$ elements and a probability of success $f$. Hence, $$E_l = B_l f \quad (7)$$

The equation above shows that the expected number of additional hash probes for the prefixes of a particular length is equal to the number of Bloom filters for the longer prefixes times the false positive probability (which is the same for all the filters). Let B be the total number of Bloom filters in the system for a given configuration. The worst case value of $E_l$, which is denoted as $E_{add}$, may be expressed as:

$$E_{add} = Bf \quad (8)$$

This is the maximum number of additional hash probes per lookup, independent of input address (e.g., IP address 52). Since these are the expected additional probes due to the false positives, the total number of expected hash probes per lookup for any input address is:

$$E_{exp} = E_{add} + 1 = Bf + 1 \quad (9)$$

where the additional one probe accounts for the probe at the matching prefix length. However, there is a possibility that the IP address 52 may create a false positive matches in all the filters 101 in the system 100. In this case, the number of required hash probes is:

$$E_{worst} = B + 1 \quad (10)$$

Thus, Equation 9 gives the expected number of hash probes for a longest prefix match, and Equation 10 provides the maximum number of hash probes for a worst case lookup.

Since both values depend on B, the number of filters 101 in the system 100, reducing B is important to limit the worst case. In one implementation of the system 100, the value of B is equal to W.

Accordingly, the system 100 provides high performance independent of prefix database characteristics and input address patterns, with a search engine (e.g., search engine 110 in FIG. 1) that achieves, for example, an average of one hash probe per lookup, bounds the worst case search, and utilizes a small amount of embedded memory.

Several variables affect system performance and resource utilization:

N, the target amount of prefixes supported by the system;

M, the total amount of embedded memory available for the Bloom filters;

W, the number of unique prefix lengths supported by the system;

$m_i$, the size of each Bloom filter;

$k_i$, the number of hash functions computed in each Bloom filter; and $n_i$, the number of prefixes stored in each Bloom filter.

For clarity in the discussion, IPv4 addresses (e.g., IP address 52) are assumed to be 32-bits long. Therefore, in the worst case, W=32. Given that current IPv4 BGP tables are in excess of 100,000 entries, N=200,000 may be used in one implementation of system 100. Further, the number of hash functions per filter 101 may be set, for example, such that the false positive probability $f$ is a minimum for a filter 101 of length m. The feasibility of designing system 100 to have selectable values of k is discussed below.

As long as the false positive probability is kept the same for all the Bloom filters 101, the system 100 performance is independent from the prefix distribution. Let $f_i$ be the false positive probability of the $i^{th}$ Bloom filter. Given that the filter is allocated $m_i$ bits of memory, stores $n_i$ prefixes, and performs $k_i = (m_i/n_i)\ln 2$ hash functions, the expression for $f_i$ becomes, $$f_i = f\left(\frac{1}{2}\right)^{(m_i/n_i)\ln 2} \forall\, i \in [1 \ldots 32] \quad (11)$$

This implies that:

$$m_1/n_1 = m_2/n_2 = \ldots = m_i/n_i = \ldots = m_{32}/n_{32} = \Sigma m_i / \Sigma n_i = M/N \quad (12)$$

Therefore, the false positive probability $f_i$ for a given filter i may be expressed as:

$$f_i = f = (1/2)^{(M/N)\ln 2} \quad (13)$$

Based on the preceding analysis, the expected number of hash probes executed by the system 100 per lookup depends only on the total amount of memory resources, M, and the total number of supported prefixes, N. This is independent from the number of unique prefix lengths and the distribution of prefixes among the prefix lengths.

Figure 2:
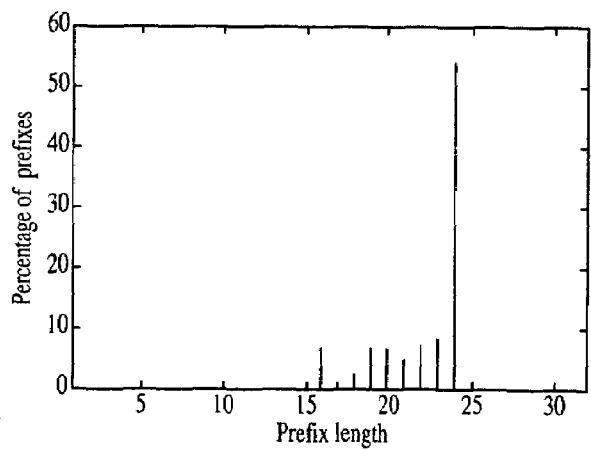
FIG. 2 depicts an average prefix length distribution for IPv4 Border Gate Protocol ("BGP") table snapshots according to one embodiment consistent with the present invention.

The preceding analysis indicates that memory (not shown in figures) may be proportionally allocated to each Bloom filter 101 based on its share of the total number of prefixes. Given a static, uniform distribution of prefixes, each Bloom filter 101 may be allocated m=M/B bits of memory. Examining of standard IP forwarding tables reveals that the distribution of prefixes is not uniform over the set of prefix lengths. Routing protocols also distribute periodic updates; hence, forwarding tables are not static. For example, with 15 snapshots of IPv4 BGP tables, and for gathered statistics on prefix length distributions, as expected, the prefix distributions for the IPv4 tables demonstrated common trends such as large numbers of 24-bit prefixes and few prefixes of length less than 8-bits. An average prefix distribution for all of the tables in this example, is shown in FIG. 2.

In an exemplary static system configured for uniformly distributed prefix lengths to search a database with non-uniform prefix length distribution, some filters are "over-allocated" to memory while others are "under-allocated." Thus, the false positive probabilities for the Bloom filters are no longer equal. In this example, the amount of embedded memory per filter is proportionally allocated based on its current share of the total prefixes and the number of hash functions is adjusted to maintain a minimal false positive probability. This exemplary configuration is termed "asymmetric Bloom filters", and a device architecture capable of supporting it is discussed below. Using Equation 9 for the case of IPv4, the expected number of hash probes per lookup, $E_{exp}$, may be expressed as:

$$E_{exp} = 32 \times (1/2)^{(M \ln 2/N)} + 1 \quad (14)$$

Figure 3:
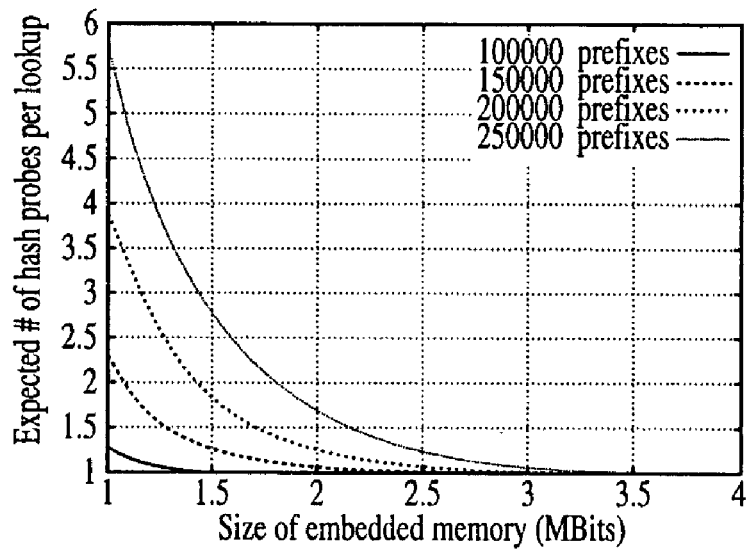
FIG. 3 depicts an expected number of hash probes per lookup, Eexp, versus total embedded memory size, M, for various values of total prefixes, N, using a basic configuration for IPv4 with 32 asymmetric Bloom filters, according to one embodiment consistent with the present invention.

Given the feasibility of asymmetric Bloom filters, the expected number of hash probes per lookup, $E_{exp}$, is plotted versus total embedded memory size M for various values of N in FIG. 3. With a modest 2 Mb embedded memory, for example, the expected number of hash probes per lookup is less than two for 250,000 prefixes. The present exemplary system 100 is also memory efficient as it only requires 8 bits of embedded memory per prefix. Doubling the size of the embedded memory to 4 Mb, for example, provides near optimal average performance of one hash probe per lookup. Using Equation 10, the worst case number of dependent memory accesses is simply 33. The term for the access for the matching prefix may be omitted, because the default route may be stored internally. Hence, in this implementation of system 100, the worst case number of dependent memory accesses is 32.

The preceding analysis illustrates how asymmetric Bloom filters 101 consistent with the present invention may achieve near optimal average performance for large numbers of prefixes with a modest amount of embedded memory.

Since the distribution statistics shown in FIG. 2 indicate that sets associated with the first few prefix lengths are typically empty and the first few non-empty sets hold few prefixes, the system 100 may use a direct lookup array device (112 in FIG. 1) for the first few prefix lengths as an efficient way to represent shorter prefixes while reducing the number of Bloom filters 101. For every prefix length represented in the direct lookup array device 112, the number of worst case hash probes is reduced by one. Use of the direct lookup array device 112 also reduces the amount of embedded memory required by the Bloom filters 101 to achieve optimal average performance, as the number of prefixes represented by Bloom filters is decreased.

Figure 4:
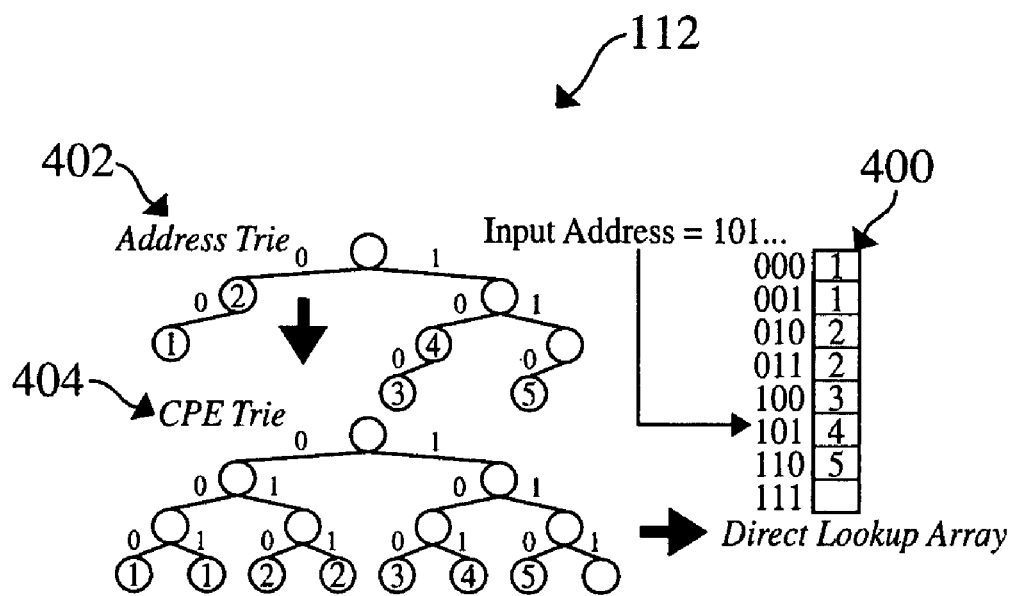
FIG. 4 depicts a direct lookup array for the first three prefix lengths according to one embodiment consistent with the present invention.

One implementation of the direct lookup array device 112 for the first a=3 prefixes is shown in FIG. 4. This implementation of the direct lookup array device includes a direct lookup array 400 that is operatively connected to a binary trie device 402 and a controlled prefix expansion (CPE) trie 404. The prefixes of length≦a are stored in the binary trie 402. CPE trie 404 performs a CPE on a stride length equal to a. The next hop associated with each leaf at level a of the CPE trie is written to a respective array slot of the direct lookup array 400 addressed by the bits labeling the path from the root to the leaf. The direct lookup array 400 is searched by using the first a bits of the IP destination address 52 to index into the array 400. For example, as shown in FIG. 4, an address 52 with initial bits 101 would result in a next hop of 4. The direct lookup array 400 requires $2^a \times \text{NH}_{len}$ bits of memory, where $\text{NH}_{len}$ is the number of bits required to represent the next hop.

For example, a=20 results in a direct lookup array 400 with 1 M slots. For a 256 port router (e.g., router 50) where the next hop corresponds to the output port, 8 bits are required to represent the next hop value and the direct lookup array 400 requires 1 MB of memory. Use of a direct lookup array 400 for the first 20 prefix lengths leaves prefix lengths 21 . . . 32 to Bloom filters 101. Thus, the expression for the expected number of hash probes per lookup performed by the search engine 110 of the system 100 becomes:

$$E_{exp} = 12 \times (1/2)^{(M \ln 2/N - N_{[1:20]})} \quad (15)$$

where $N_{[1:20]}$ is the sum of the prefixes with lengths [1:20].

Figure 5:
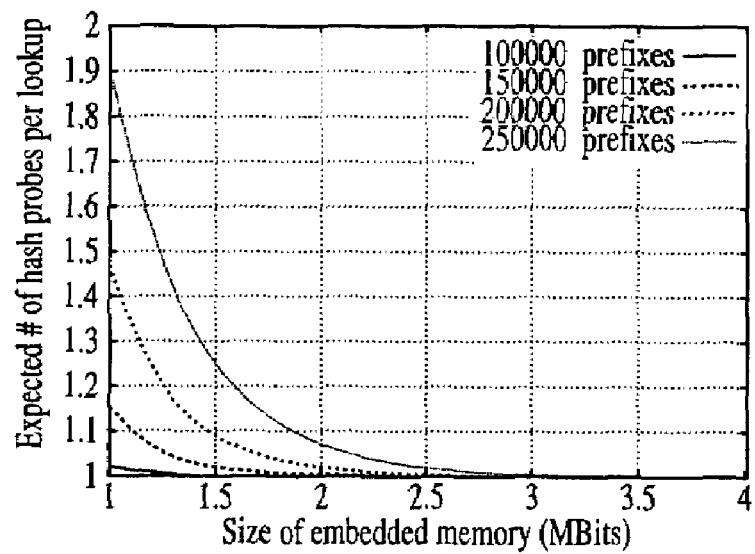
FIG. 5 depicts an expected number of hash probes per lookup, Eexp, versus total embedded memory size, M, for various values of total prefixes, N, using a direct lookup array for prefix lengths 1 . . . 20 and 12 Bloom filters for prefix lengths 21 . . . 32, according to one embodiment consistent with the present invention.

On average, the $N_{[1:20]}$ prefixes constitute 24.6% of the total prefixes in the sample IPv4 BGP tables. Therefore, 75.4% of the total prefixes N are represented in the Bloom filters 101 in this implementation. Given this distribution of prefixes, the expected number of hash probes per lookup versus total embedded memory size for various values of N is shown in FIG. 5. The expected number of hash probes per lookup for databases containing 250,000 prefixes is less than two when using a small 1 Mb embedded memory. Doubling the size of the memory to 2 Mb, for example, reduces the expected number of hash probes per lookup to less than 1.1 for 250,000 prefix databases. Although the amount of memory required to achieve good average performance has decreased to only 4 bits per prefix, for example, the worst case hash probes per lookup is still large. Using Equation 10, the worst case number of dependent memory accesses becomes $E_{worst} = (32-20)+1 = 13$. For an IPv4 database containing the maximum of 32 unique prefix lengths, for example, the worst case is 13 dependent memory accesses per lookup.

A high-performance implementation option for the system 100 is to make the direct lookup array device 112 the final stage in a pipelined search architecture. IP destination addresses 52 that reach this stage with a null next hop value would use the next hop retrieved from the direct lookup array 400 of the device 112. A pipelined architecture requires a dedicated memory bank or port for the direct lookup array 400.

The number of remaining Bloom filters 101 may be reduced by limiting the number of distinct prefix lengths via further use of Controlled Prefix Expansion (CPE). It is desirable to limit the worst case hash probes to as few as possible without prohibitively large embedded memory requirements. Clearly, the appropriate choice of CPE strides depends on the prefix distribution. As illustrated in the average distribution of IPv4 prefixes shown in FIG. 2, for example, in all of the sample databases that may be used to hold a routing table 58 of IP address 52 prefixes, there is a significant concentration of prefixes from lengths 21 to 24. On average, 75.2% of the N prefixes fall in the range of 21 to 24.

Likewise, it is shown for example, in all of the sample databases, that prefixes in the 25 to 32 range are extremely sparse. Specifically, 0.2% of the N prefixes fall in the range 25 to 32. (Note that 24.6% of the prefixes fall in the range of 1 to 20.)

Based on these observations, in one implementation of the system 100, the prefixes not covered by the direct lookup array 400 are divided into 2 groups, $G_1$ and $G_2$, for example, corresponding to prefix lengths 21-24 and 25-32, respectively. Each exemplary group is expanded out to the upper limit of the group so that $G_1$ contains only length 24 prefixes and $G_2$ contains only length 32 prefixes. For example, $N_{[21:24]}$ is the number of prefixes of length 21 to 24 before expansion and $N_{[25:32]}$ is the number of prefixes of length 25 to 32 before expansion. Use of CPE operations by the system 100, such as shown in FIG. 4, increases the number of prefixes in each group by an "expansion factor" factor $\alpha_{[21:24]}$ and $\alpha_{[25:32]}$, respectively. In one example, Applicants observed an average value of 1.8 for $\alpha_{[21:24]}$, and an average value of 49.9 for $\alpha_{[25:32]}$ in the sample databases. Such a large value of $\alpha_{[25:32]}$ is tolerable due to the small number of prefixes in $G_2$. By dividing the prefixes not covered by the direct lookup array 400 and using CPE operations with the direct lookup array 400, the system 100 may have two Bloom filters 101 and the direct lookup array 400, bounding the worst case lookup to two hash probes and one array lookup. The expression for the expected number of hash probes per lookup becomes:

$$E_{exp} = 2 \times \left(\frac{1}{2}\right)^{\left[\frac{M \ln 2}{\alpha_{[21:24]} N_{[21:24]} + \alpha_{[25:32]} N_{[25:32]}}\right]} \quad (16)$$

Figure 6:
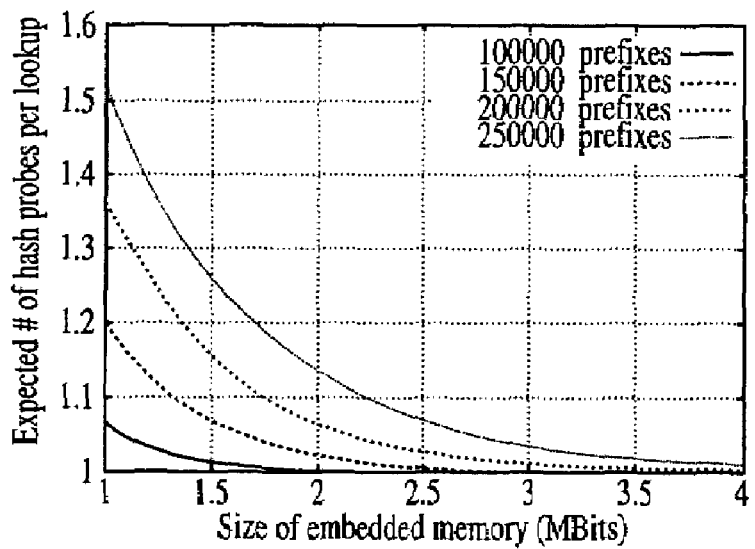
FIG. 6 depicts an expected number of hash probes per lookup, Eexp, versus total embedded memory size, M, for various values of total prefixes, N, using a direct lookup array for prefix lengths 1 . . . 20, and two Bloom filters for prefix lengths 21 . . . 24 and 25 . . . 32, according to one embodiment consistent with the present invention.

Using the observed average distribution of prefixes and observed average values of $\alpha_{[21:24]}$ and $\alpha_{[25:32]}$, the expected number of hash probes per lookup versus total embedded memory M for various values of N is shown in FIG. 6. In this example, the expected number of hash probes per lookup for databases containing 250,000 prefixes is less than 1.6 when using a small 1 Mb embedded memory. Doubling the size of the memory to 2 Mb reduces the expected number of hash probes per lookup to less than 1.2 for 250,000 prefix databases. The use of CPE to reduce the number of Bloom filters 101 allows the system 100 to perform a maximum of two hash probes and one array access per network address lookup, for example, while maintaining near optimal average network address lookup performance with modest use of embedded memory resources.

The following provides simulation results for each of three embodiments of system 100 consistent with the present invention, each of which use forwarding or routing tables (e.g., table 58) constructed from standard IPv4 BGP tables. The exemplary embodiments of the present invention are termed:

Scheme 1: This first exemplary scheme is the system 100 configuration which uses asymmetric Bloom filters 101 for all prefix lengths as described previously;

Scheme 2: This second exemplary scheme that may be employed by system 100 uses a direct lookup array device 112 for prefix lengths [1 . . . 20] and asymmetric Bloom filters 101 for prefix lengths [21 . . . 32] as described previously; and Scheme 3: This third exemplary scheme that may be employed by system 100 uses a direct lookup array device 112 for prefix lengths [1 . . . 20] and two asymmetric Bloom filters 101 for CPE prefix lengths 24 and 32 which represent prefix lengths [21 . . . 24] and [25 . . . 32], respectively, as described above.

For each of the three schemes, M=2 Mb, for example, and $m_i$ is adjusted for each asymmetric Bloom filter 101 according to the distribution of prefixes of the database under test. Fifteen IPv4 BGP tables were collected, and for each combination of database and system 100 configuration, the theoretical value of $E_{exp}$ was computed using Equations 14, 15, and 16. A simulation was run for every combination of database and system 100 configuration. The ANSI C rand function was used to generate hash values for the Bloom filters 101, as well as the prefix hash tables 103. The collisions in the prefix hash tables 103 were around 0.8% which is negligibly small.

In order to investigate the effects of input addresses on system 100 network address lookup performance, various traffic patterns varying from completely random addresses to only addresses with a valid prefix in the database were placed under test. In the latter case, the IP addresses 52 were generated in proportion to the prefix distribution. Thus, IP addresses corresponding to a 24 bit prefix in the database dominated the input traffic. One million IP addresses were applied for each test run. Input traffic patterns with randomly generated IP addresses generated no false positives in any of the tests for the three schemes or system 100 configurations. The false positives increased as the traffic pattern contained more IP addresses corresponding to the prefixes in the database.

Maximum false positives were observed when the traffic pattern consisted of only the IP addresses corresponding to the prefixes in the database. Hence, the following results correspond to this input traffic pattern. The average number of hash probes per lookup from the test runs with each of the databases on all three schemes or system 100 configurations, along with the corresponding theoretical values, are shown in Table 1. The maximum number of memory accesses (hash probes and direct lookup) per lookup was recorded for each test run of all the schemes. While the theoretical worst case memory accesses per lookup for Scheme 1 and Scheme 2 are 32 and 13, respectively, the worst observed lookups required less than four memory accesses in all test runs. For scheme 3, in most of test runs, the worst observed lookups required three memory accesses.

TABLE 1

|  |  | Scheme 1 | | Scheme 2 | | Scheme 3 | |
| --- | --- | --- | --- | --- | --- | --- | --- |
| Database | Prefixes | Theoretical | Observed | Theoretical | Observed | Theoretical | Observed |
| 1 | 116,819 | 1.008567 | 1.008047 | 1.000226 | 1.000950 | 1.000504 | 1.003227 |
| 2 | 101,707 | 1.002524 | 1.005545 | 1.000025 | 1.000777 | 1.002246 | 1.001573 |
| 3 | 102,135 | 1.002626 | 1.005826 | 1.000026 | 1.000793 | 1.002298 | 1.001684 |
| 4 | 104,968 | 1.003385 | 1.006840 | 1.000089 | 1.000734 | 1.00443 | 1.003020 |
| 5 | 110,678 | 1.005428 | 1.004978 | 1.000100 | 1.000687 | 1.003104 | 1.000651 |
| 6 | 116,757 | 1.008529 | 1.006792 | 1.000231 | 1.000797 | 1.004334 | 1.000831 |
| 7 | 117,058 | 1.008712 | 1.007347 | 1.000237 | 1.000854 | 1.008014 | 1.004946 |
| 8 | 119,326 | 1.010183 | 1.009998 | 1.000297 | 1.001173 | 1.012303 | 1.007333 |
| 9 | 119,503 | 1.010305 | 1.009138 | 1.000303 | 1.001079 | 1.008529 | 1.005397 |
| 10 | 120,082 | 1.010712 | 1.009560 | 1.000329 | 1.001099 | 1.016904 | 1.010076 |
| 11 | 117,221 | 1.008806 | 1.007218 | 1.000239 | 1.000819 | 1.004494 | 1.002730 |
| 12 | 117,062 | 1.008714 | 1.006885 | 1.000235 | 1.000803 | 1.004439 | 1.000837 |
| 13 | 117,346 | 1.008889 | 1.006843 | 1.000244 | 1.000844 | 1.004515 | 1.000835 |
| 14 | 117,322 | 1.0008874 | 1.008430 | 1.000240 | 1.001117 | 1.004525 | 1.003111 |
| 15 | 117,199 | 1.008798 | 1.007415 | 1.000239 | 1.000956 | 1.004526 | 1.002730 |
| Average | 114,344 | 1.007670 | 1.007390 | 1.000204 | 1.000898 | 1.006005 | 1.003265 |

Using Scheme 3 or the third system 100 configuration, the average number of hash probes per lookup over all test databases was found to be 1.003, which corresponds to a lookup rate of about 332 million lookups per second with a commodity SRAM device operating at 333 MHz. This is an increase in speed of 3.3 times over state-of-the-art TCAM-based solutions.

At the same time, Scheme 3 had a worst case performance of 2 hash probes and one array access per lookup. Assuming that the array 400 is stored in the same memory device as the tables 103, worst case performance is 110 million lookups per second, which exceeds current TCAM performance. Note that the values of the expected hash probes per lookup as shown by the simulations generally agree with the values predicted by the equations.

Figure 7:
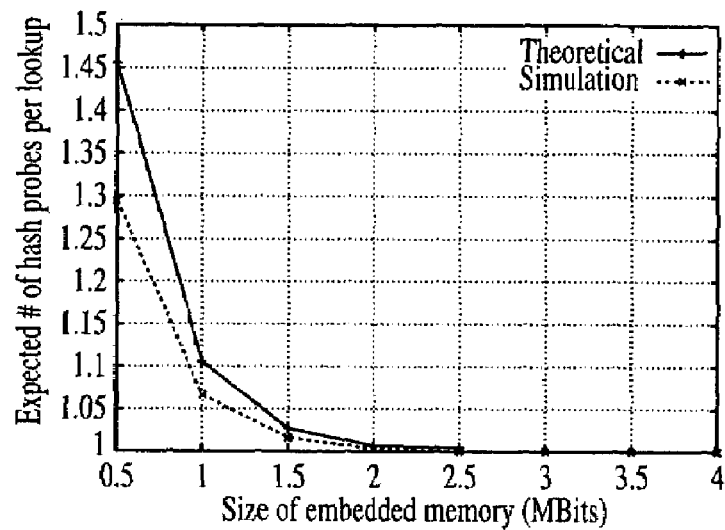
FIG. 7 depicts an average number of hash probes per lookup for Scheme 3 programmed with database 1, where N=116,819 for various embedded memory sizes M, according to one embodiment consistent with the present invention.

A direct comparison was made between the theoretical performance and observed performance for each scheme or system 100 configuration. To see the effect of total embedded memory resources (M) for Bloom filters 101, Scheme 3 was simulated with database 1 and N=116189 prefixes for various values of M between 500 kb and 4 Mb. FIG. 7 shows theoretical and observed values for the average number of hash probes per lookup for each value of M. Simulation results show slightly better performance than the corresponding theoretical values. This improvement in the performance may be attributed to the fact that the distribution of input addresses 52 has been matched to the distribution of prefixes in the database under test. Since length 24 prefixes dominate real databases, arriving packets are more likely to match the second Bloom filter 101 and less likely to require an array 400 access.

Thus, the number of dependent memory accesses per lookup may be held constant given that memory resources scale linearly with database size. Given this characteristic of the system 100, and the memory efficiency demonstrated for IPv4, a network address lookup system and method consistent with the present invention is suitable for high-speed IPv6 route lookups.

Figure 8:
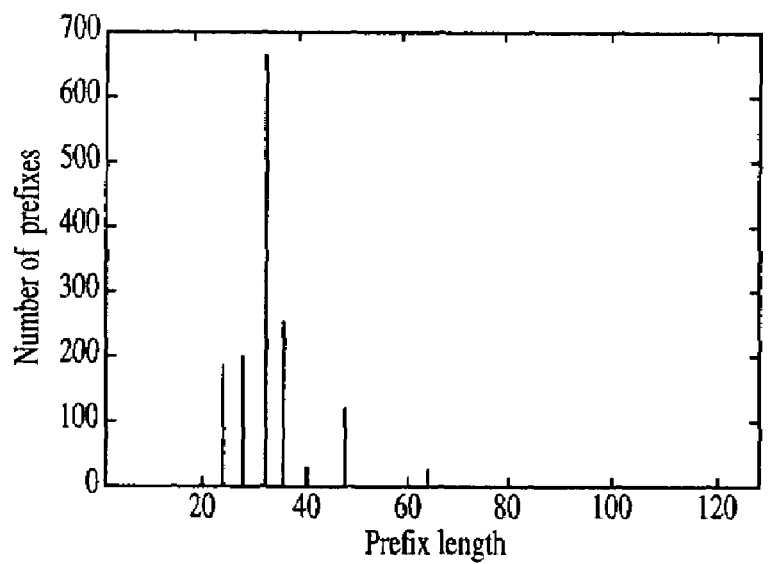
FIG. 8 depicts a combined prefix length distribution for Internet Protocol Version 6 ("IPv6") BGP table snapshots, according to one embodiment consistent with the present invention.

In order to assess the current state of IPv6 tables, five IPv6 BGP table snapshots were collected from several sites. Since the tables are relatively small, a combined distribution of prefix lengths was computed. FIG. 8 shows the combined distribution for a total of 1,550 prefix entries. A significant result is that the total number of unique prefix lengths in the combined distribution is 14, less than half of the number for the IPv4 tables studied.

IPv6 unicast network addresses may be aggregated with arbitrary prefix lengths like IPv4 network addresses under CIDR. Although this provides extensive flexibility, the flexibility does not necessarily result in a large increase in unique prefix lengths.

The global unicast network address format has three fields: a global routing prefix; a subnet ID; and an interface ID. All global unicast network addresses, other than those that begin with 000, must have a 64-bit interface ID in the Modified EUI-64 format. These interface IDs may be of global or local scope; however, the global routing prefix and subnet ID fields must consume a total of 64 bits. Global unicast network addresses that begin with 000 do not have any restrictions on interface ID size; however, these addresses are intended for special purposes such as embedded IPv4 addresses. Embedded IPv4 addresses provide a mechanism for tunneling IPv6 packets over IPv4 routing infrastructure. This special class of global unicast network addresses should not contribute a significant number of unique prefix lengths to IPv6 routing tables.

In the future, IPv6 Internet Registries must meet several criteria in order to receive an address allocation, including a plan to provide IPv6 connectivity by assigning /48 address blocks. During the assignment process, /64 blocks are assigned when only one subnet ID is required and /128 addresses are assigned when only one device interface is required. Although it is not clear how much aggregation will occur due to Internet Service Providers assigning multiple /48 blocks, the allocation and assignment policy provides significant structure. Thus, IPv6 routing tables will not contain significantly more unique prefix lengths than current IPv4 tables.

Accordingly, systems and methods consistent with the present invention provide a longest prefix matching approach that is a viable mechanism for IPv6 routing lookups. Due to the longer "strides" between hierarchical boundaries of IPv6 addresses, use of Controlled Prefix Expansion (CPE) to reduce the number of Bloom filters 101 may not be practical. In this case, a suitable pipelined architecture may be employed to limit the worst case memory accesses.

The ability to support a lookup table of a certain size, irrespective of the prefix length distribution is a desirable feature of the system 100. Instead of building distribution dependent memories of customized size, for example, a number of small fixed-size Bloom filters called mini-Bloom filters (902 in FIG. 9) may be built for the system 100 in lieu of Bloom filters 101. For example, let the dimensions of each mini-Bloom filter 902 be an m' bit long vector with a capacity of n' prefixes. The false positive probability of the mini-Bloom filter 902 is:

$$f'=(\tfrac{1}{2})^{(m'/n')ln2} \tag{17}$$

In this implementation, instead of allocating a fixed amount of memory to each of the Bloom filters 101, multiple mini-Bloom filters were proportionally allocated according to the prefix distribution. In other words, on-chip resources were allocated to individual Bloom filters in units of mini-Bloom filters 902 instead of bits. While building the database, the prefixes of a particular length across the set of mini-Bloom filters 902 allocated to it were uniformly distributed, and each prefix is stored in only one mini-Bloom filter 902. This uniform random distribution of prefixes was achieved within a set of mini-Bloom filters by calculating a primary hash over the prefix. The prefix is stored in the mini-Bloom filter 902 pointed to by this primary hash value, within the set of mini-bloom filters, as illustrated by the dashed line in FIG. 9.

In the membership query process, a given IP address is dispatched to all sets of mini-Bloom filters 902 for distinct prefix lengths on a tri-state bus 904. The same primary hash function is calculated on the IP address to find out which one of the mini-Bloom filters 902 within the corresponding set should be probed with the given prefix. This mechanism ensures that an input IP address probes only one mini-Bloom filter 902 in the set associated with a particular prefix length as shown by the solid lines in FIG. 9.

Figure 9:
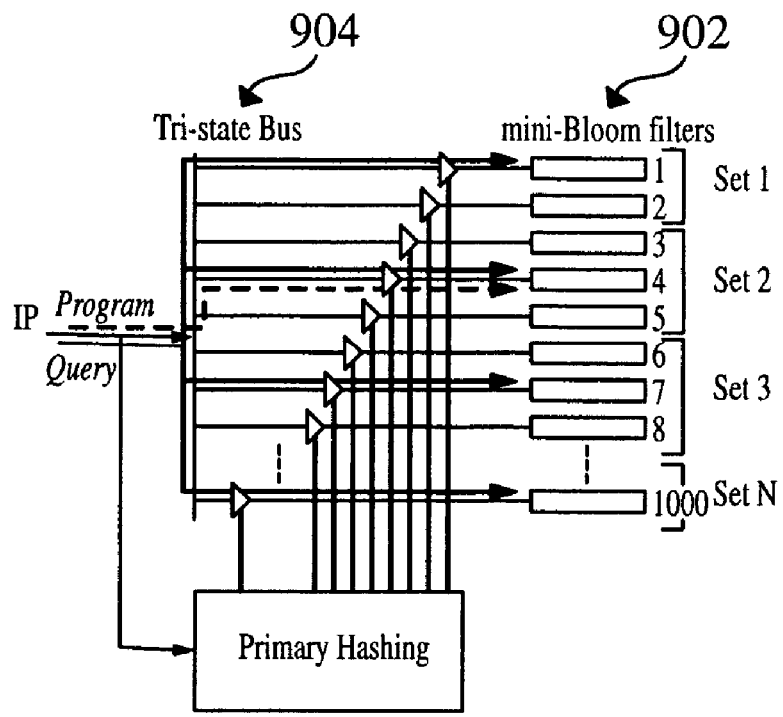
FIG. 9 depicts a plurality of Mini-Bloom filters which allow the system, according to one embodiment consistent with the present invention, to adapt to prefix distribution. The dashed line shows a programming path for a prefix of length 2, and the solid line illustrates query paths for an input IP address.

Since the prefix is hashed or probed in only one of the mini-Bloom filters 902 in each set, the aggregate false positive probability of a particular set of mini-Bloom filters 902 is the same as the false positive probability of an individual mini-Bloom filter. Hence, the false positive probability of the present embodiment remains unchanged if the average memory bits per prefix in the mini-Bloom filter 902 is the same as the average memory bits per prefix in the original scheme. The importance of the scheme shown in FIG. 9 is that the allocation of the mini-Bloom filters for different prefix lengths may be changed unlike in the case of hardwired memory. The tables which indicate the prefix length set and its corresponding mini-Bloom filters may be maintained on-chip with reasonable hardware resources. The resource distribution among different sets of mini-Bloom filters 902 may be reconfigured by updating these tables. This flexibility makes the present invention independent from prefix length distribution.

The number of hash functions k, is essentially the lookup capacity of the memory storing a Bloom filter 101. Thus, k=6 implies that 6 random locations must be accessed in the time allotted for a Bloom filter query. In the case of single cycle Bloom filter queries, on-chip memories need to support at least k reading ports. Fabrication of 6 to 8 read ports for an on-chip Random Access Memory is attainable with existing embedded memory technology.

Figure 10A:
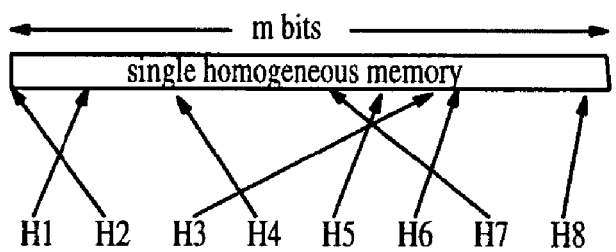
FIG. 10a depicts a Bloom filter with single memory vector with k=8, according to one embodiment consistent with the present invention.
Figure 10B:
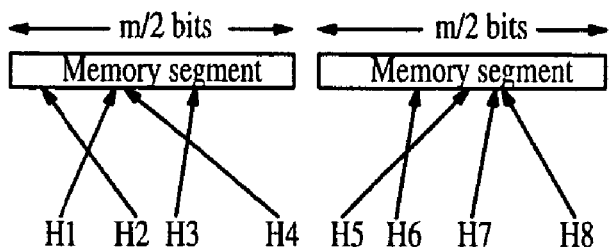
FIG. 10b depicts two Bloom Filters of length m/2 with k=4, combined to realize an m-bit long Bloom filter with k=8, according to one embodiment consistent with the present invention.

For designs with values of k higher than what may be realized by technology, a single memory with the desired lookups is realized by employing multiple smaller memories, with fewer ports. For instance, if the technology limits the number of ports on a single memory to 4, then 2 such smaller memories are required to achieve a lookup capacity of 8 as shown in FIG. 10b. The Bloom filter 101 allows any hash function to map to any bit in the vector. It is possible that for some member, more than 4 hash functions map to the same memory segment, thereby exceeding the lookup capacity of the memory. This problem may be solved by restricting the range of each hash function to a given memory. This avoids collision among hash functions across different memory segments.

In general, if h is the maximum lookup capacity of a RAM as limited by the technology, then k/h such memories of size m/(k/h) may be combined to realize the desired capacity of m bits and k hash functions. When only h hash functions are allowed to map to a single memory, the false positive probability may be expressed as:

$$f'=[1-(1-1/m/(k/h))^{hn}]^{(k/h)h} \approx [1-e^{-nk/m}]^k \tag{18}$$

Comparing equation 18 with equation 2, restricting the number of hash functions mapping to a particular memory, does not affect the false positive probability provided the memories are sufficiently large.

Accordingly, a Longest Prefix Matching (LPM) system consistent with the present invention employs Bloom filters to efficiently narrow the scope of the network address lookup search. In order to optimize average network address lookup performance, asymmetric Bloom filters 101 may be used that allocate memory resources according to prefix distribution and provide viable means for their implementation. By using a direct lookup array 400 and Controlled Prefix Expansion (CPE), worst case performance is limited to two hash probes and one array access per lookup. Performance analysis and simulations show that average performance approaches one hash probe per lookup with modest embedded memory resources, less than 8 bits per prefix. The future viability for IPv6 route lookups is assured with the present invention. If implemented in current semiconductor technology and coupled with a commodity SRAM device operating at 333 MHz, the present system could achieve average performance of over 300 million lookups per second and worst case performance of over 100 million lookups per second. In comparison, state-of-the-art TCAM-based solutions for LPM provide 100 million lookups per second, consume 150 times more power per bit of storage than SRAM, and cost approximately 30 times as much per bit of storage than SRAM.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A method of performing a network address lookup, comprising: grouping forwarding prefixes from a routing table by prefix length; associating each of a plurality of Bloom filters with a unique prefix length; programming each of said plurality of Bloom filters with said prefixes corresponding to said associated unique prefix length; performing membership probes to said Bloom filters by using predetermined prefixes of a network address; and utilizing a direct lookup array for initial prefix lengths and asymmetric Bloom filters for the rest of the prefix lengths; wherein said direct lookup array comprises: storing prefixes of not more than a predetermined number for a predetermined length, in a binary trie; performing Controlled Prefix Expansion (CPE) in a CPE trie for a stride length equal to said predetermined number; writing a next hop associated with each leaf at a level of said CPE trie corresponding to said predetermined number to an array slot addressed by bits that label a path from a root of said CPE trie to said leaf; and searching said array using bits of said network address of said predetermined number to index into said array.

2. The method according to claim 1, further comprising: storing said prefixes in a hash table.

3. The method according to claim 2, wherein said hash table comprises a single hash table containing all of the prefixes.

4. The method according to claim 2, wherein said hash table comprises a plurality of hash tables, each containing prefixes of a particular length.

5. The method according to claim 1 wherein the Bloom filters comprise a bit vector of a plurality of bits.

6. The method according to claim 5 further comprising providing a plurality of counting Bloom filters, each corresponding to one of the plurality of Bloom filters and each counting Bloom filter comprising a plurality of counters corresponding to the plurality of bits in its corresponding Bloom filter.

7. The method according to claim 1, wherein said Bloom filters are characterized by a false positive probability greater than zero and a false negative probability of zero.

8. The method according to claim 2, wherein the step of performing membership probes comprises the step of probing the hash table corresponding to said prefix lengths represented in a match vector in an order of longest prefix to shortest prefix.

9. The method according to claim 8, wherein probing of said hash tables is terminated when a match is found, and all of said prefix lengths represented in said match vector are searched.

10. The method according to claim 7, wherein the false positive probability is the same for all of said Bloom filters such that performance is independent of prefix distribution.

11. The method according to claim 5, further comprising: providing asymmetric Bloom filters by proportionally allocating an amount of an embedded memory per Bloom filter based on said Bloom filter's current share of a total number of prefixes while adjusting a number of hash functions of said Bloom filters to maintain a minimal false positive probability.

12. The method according to claim 9, wherein a number of hash probes to said hash table per lookup is held constant for network address lengths in said routing table that are greater than a predetermined length.

13. The method according to claim 9, wherein a number of dependent memory accesses per network lookup is held constant for additional unique prefix lengths in a forwarding table, provided that memory resources scale linearly with a number of prefixes in said routing table.

14. The method according to claim 1, wherein for every prefix length represented in said direct lookup array, a number of worst case hash probes is reduced by one.

15. The method according to claim 5, further comprising: uniformly distributing prefixes of a predetermined length across a set of mini-Bloom filters; and storing each of said prefixes in only one of said mini-Bloom filters.

16. The method according to claim 15, further comprising: calculating a primary hash value over said one of said prefixes.

17. The method according to claim 16, further comprising: storing said one of said prefixes in said one of said mini-Bloom filters pointed to by said primary hash value, within said set.

18. The method according to claim 17, further comprising: dispatching a given network address to all sets of mini-Bloom filters for distinct prefix lengths on a tri-state bus in said probing process.

19. The method according to claim 17, wherein a same primary hash value is calculated on said network address to determine which of said mini-Bloom filters within a corresponding set should be probed with a given prefix.

20. A system for performing a network address lookup, comprising: means for sorting forwarding prefixes from a routing table by prefix length; means for associating each of a plurality of Bloom filters with a unique prefix length; means for programming each of said plurality of Bloom filters with said prefixes corresponding to said associated unique prefix length; means for performing membership queries to said Bloom filters by using predetermined prefixes of a network address; and a direct lookup array for initial prefix lengths and asymmetric Bloom filters for the rest of the prefix lengths; wherein said direct lookup array comprises: prefixes of not more than a predetermined number for a predetermined length, in a binary trie; means for performing Controlled Prefix Expansion (CPE) in a CPE trie for a stride length equal to said predetermined number; means for writing a next hop associated with each leaf at a level of said CPE trie corresponding to said predetermined number to an array slot addressed by bits labeling a path from a root of said CPE trie to said leaf; and means for searching said array using bits of said network address of said predetermined number to index into said array.

21. The system according to claim 20, further comprising a hash table operable to store said prefixes.

22. The system according to claim 21 wherein said hash table comprises a single hash table containing all of the prefixes.

23. The system according to claim 21, wherein said hash table comprises a plurality of hash tables, each containing prefixes of a particular length.

24. The system according to claim 20, wherein the Bloom filters comprise a bit vector of a plurality of bits.

25. The system according to claim 24 further comprising a plurality of counting Bloom filters, each corresponding to one of the plurality of Bloom filters and each counting Bloom filter comprising a plurality of counters corresponding to the plurality of bits in its corresponding Bloom filter.

26. The system according to claim 21, wherein the means for performing membership queries comprises the means for probing the hash table corresponding to said prefix lengths represented in a match vector in an order of longest prefix to shortest prefix.

27. The system according to claim 20, wherein for every prefix length represented in said direct lookup array, a number of worst case hash probes is reduced by one.

28. The system according to claim 20, further comprising: means for utilizing CPE to reduce a number of said Bloom filters such that a maximum of two hash probes and one array access per network lookup is achieved.

29. The system according to claim 20, wherein multiple mini-Bloom filters are proportionally allocated according to a prefix distribution.

30. The system according to claim 29, wherein on-chip resources are allocated to individual Bloom filters in units of mini-Bloom filters instead of bits.

31. The system according to claim 30, further comprising:
means for uniformly distributing prefixes of a predetermined length across a set of mini-Bloom filters; and
means for storing each of said prefixes in only one of said mini-Bloom filters.

32. The system according to claim 31, further comprising:
means for calculating a primary hash value over said one of said prefixes.

33. The system according to claim 32, further comprising:
means for storing said one of said prefixes in said one of said mini-Bloom filters pointed to by said primary hash value, within said set.

34. The system according to claim 33, further comprising:
means for dispatching a given network address to all sets of mini-Bloom filters for distinct prefix lengths on a tri-state bus in said probing process.

* * * * *

UNITED STATES PATENT AND TRADEMARK OFFICE
CERTIFICATE OF CORRECTION

PATENT NO. : 7,602,785 B2 Page 1 of 1
APPLICATION NO. : 11/055767
DATED : October 13, 2009
INVENTOR(S) : Sarang Dharmapurikar, Praveen Krishnamurthy and David Edward Taylor It is certified that error appears in the above-identified patent and that said Letters Patent is hereby corrected as shown below:

Add the following new paragraph to column 1, directly after paragraph 1:

STATEMENT OF GOVERNMENTAL INTEREST

This invention was made with government support under grants ACI-0203869, ANI-9813723, and ANI-0096052 awarded by the National Science Foundation. The government has certain rights in the invention.

Signed and Sealed this

Thirtieth Day of March, 2010

David J. Kappos
*Director of the United States Patent and Trademark Office*